United States Patent
Johansen et al.

(10) Patent No.: US 11,681,691 B2
(45) Date of Patent: Jun. 20, 2023

(54) PRESENTING UPDATED DATA USING PERSISTING VIEWS

(71) Applicant: Numetric, Inc., Draper, UT (US)

(72) Inventors: David Johansen, Draper, UT (US); Parker Jones, Saratoga Springs, UT (US); Doug Coburn, Saratoga Springs, UT (US)

(73) Assignee: Numetric, Inc., Draper, UT (US)

( * ) Notice: Subject to any disclaimer, the term of this patent is extended or adjusted under 35 U.S.C. 154(b) by 117 days.

(21) Appl. No.: 16/685,878

(22) Filed: Nov. 15, 2019

(65) Prior Publication Data

US 2020/0159722 A1    May 21, 2020

Related U.S. Application Data

(60) Provisional application No. 62/769,267, filed on Nov. 19, 2018.

(51) Int. Cl.
*G06F 16/23* (2019.01)
*G06F 16/2455* (2019.01)

(52) U.S. Cl.
CPC ...... *G06F 16/2393* (2019.01); *G06F 16/2456* (2019.01)

(58) Field of Classification Search
CPC .......................... G06F 16/2393; G06F 16/2456
See application file for complete search history.

(56) References Cited

U.S. PATENT DOCUMENTS

| | | | |
|---|---|---|---|
| 6,205,451 B1 * | 3/2001 | Norcott | G06F 16/24556 |
| 6,882,993 B1 * | 4/2005 | Lawande | G06F 16/2393 |
| | | | 707/999.102 |
| 9,141,983 B2 * | 9/2015 | Sharma | G06Q 30/0601 |
| 10,133,767 B1 * | 11/2018 | Cole | G06F 16/245 |
| 2006/0122964 A1 * | 6/2006 | Yu | G06F 16/2393 |

(Continued)

OTHER PUBLICATIONS

Wang et al., "Efficient refreshment of materialized views with multiple sources", CIKM '99: Proceedings of the eighth international conference on Information and knowledge managementNov. 1999 pp. 375-382https://doi.org/10.1145/319950.320030 (Year: 1999).*

(Continued)

*Primary Examiner* — Mark D Featherstone
*Assistant Examiner* — Kweku William Halm
(74) *Attorney, Agent, or Firm* — Lowenstein Sandler LLP

(57) ABSTRACT

System and methods for presenting updated data using persisting views is disclosed. An example method comprises: identifying a first dataset and a second dataset; tracking updates to rows in each of the first dataset and the second dataset using a first local marker and a second local marker, respectively; performing a join between the first dataset and the second dataset; creating a materialized view using the join; identifying updates to one or more rows of the first dataset and the second dataset; identifying rows in the materialized view corresponding to the one or more rows of the first dataset and the second dataset with the identified updates, and updating, by one or more processing devices, the identified rows in the materialized view based on the identified updates to the one or more rows of the first dataset and the second dataset.

20 Claims, 20 Drawing Sheets

(56) References Cited

U.S. PATENT DOCUMENTS

| | | | |
|---|---|---|---|
| 2009/0064160 A1* | 3/2009 | Larson | G06F 16/2272 |
| | | | 718/104 |
| 2010/0205323 A1* | 8/2010 | Barsness | G06F 16/2455 |
| | | | 709/248 |
| 2011/0137875 A1* | 6/2011 | Ziauddin | G06F 16/2393 |
| | | | 707/693 |
| 2012/0101975 A1 | 4/2012 | Khosravy | |
| 2013/0138688 A1 | 5/2013 | Anderson | |
| 2013/0332487 A1* | 12/2013 | Ramesh | G06F 16/24539 |
| | | | 707/775 |
| 2015/0220600 A1 | 8/2015 | Bellamkonda | |
| 2016/0092500 A1 | 3/2016 | Perez et al. | |
| 2021/0019318 A1* | 1/2021 | Leung | G06F 16/24537 |

OTHER PUBLICATIONS

International Search Report and Written Opinion on Application No. PCT/US2019/062044, dated Jan. 30, 2020.
Oracle Database, "Data Warehousing Guide" Sep. 2007,http://staticweb.maine.edu/wp-content/uploads/2013/08/oracledatabase11gDataWarehousingGuide.pdf?78b960> entire document.

* cited by examiner

… (1)

PRESENTING UPDATED DATA USING PERSISTING VIEWS

RELATED APPLICATIONS

This application claims the benefit of U.S. Provisional Application No. 62/769,267, filed Nov. 19, 2018, the entire contents of which are incorporated by reference.

TECHNICAL FIELD

The disclosure is generally related to data store technologies, and is more specifically related to presenting updated data in a data store using persisting views.

BACKGROUND

A data store (e.g., a database) is a repository for storing, managing and providing access to collections of data. A query is used to extract data from a data store in a readable format according to a user's request. Views can be used to store a result set of a query on the data. Data may be stored across multiple data tables in a data store. Data from multiple tables need to be joined together to retrieve meaningful information out of the data store. When joins are involved, it adds complexity to retrieve data using a view when data in underlying tables have been updated.

BRIEF DESCRIPTION OF THE DRAWINGS

The disclosure is illustrated by way of examples, and not by way of limitation, and may be more fully understood with references to the following detailed description when considered in connection with the figures, in which.

DETAILED DESCRIPTION

Figure 1:
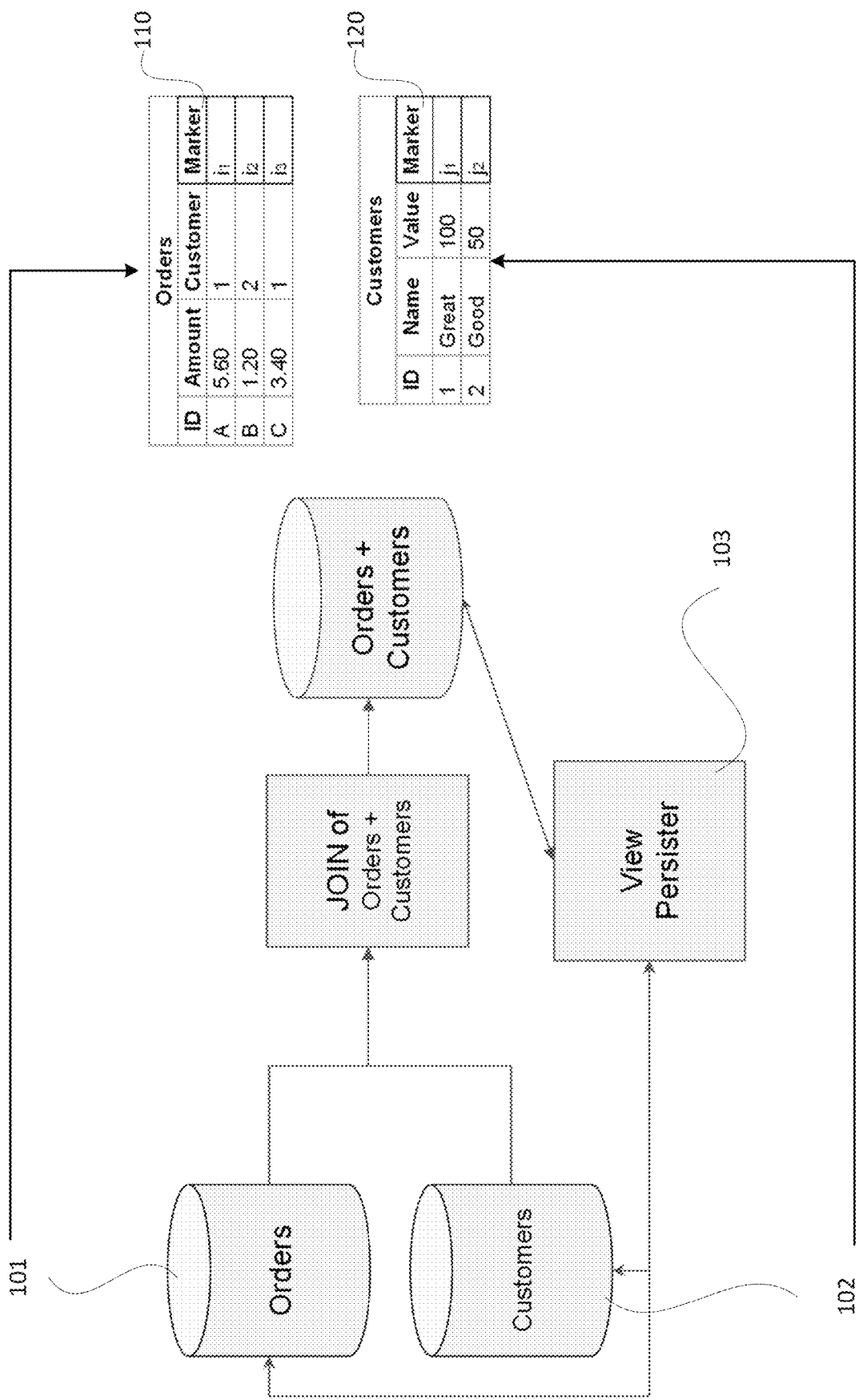
FIG. 1 illustrates tracking of updated data using a marker, in accordance with one or more aspects of the disclosure.

The current disclosure describes mechanisms for presenting updated data in a data store in an efficient and fast manner. Views were introduced as a simplification of database queries. A view is a virtual table representing the results of a database query. Generally, when a query or an update addresses an ordinary view's virtual table, the database management system converts them into queries or updates against the underlying base tables. A join operation (also referred to as "join" or "joins") combines columns from one or more tables in a relational database. When joins are involved, using views can result in performance problems as the joins are completed dynamically. Materialized views were introduced to continue to provide benefits of ordinary views while addressing the performance issues. For a materialized view, the query result is cached as a concrete or "materialized" table that may be updated from the original base tables from time to time. When multiple base tables are joined, if there is an update to a few rows in one table, there is additional complexity added to update the materialized views. Various triggers and/or rules need to be maintained and additional tables may need to be added to keep the views updated. If data needs to be refreshed frequently, the performance of the materialized view update can be a complex process and take a long time to finish. For example, in order to provide the updated results, a view may need to be re-processed to rerun all rows in the tables even if the majority of the rows have not been changed. In some instances, running the associated joins can take days, for example, before the view is completely updated.

The present disclosure provides for a mechanism to update views while minimizing complexity and increasing speed and efficiency in performing the update. The mechanism may perform tasks outside of the views to absorb the changes in the base tables by tracking changed data on each of the individual base tables in order to update the view for the rows of data that changed. Using this mechanism, the entire view does not have to be rerun, only the rows impacted by the changed data can be processed and the update can be performed efficiently and effectively providing near real time updated data.

In one implementation, a first dataset in a data store may be identified and a second dataset in the data store may be identified. Updates to rows (e.g., updated data in the rows) in the first dataset may be tracked using a first local marker and updates to rows in the second dataset may be tracked using a second local marker. A join may be performed between the first dataset and the second dataset. A materialized view may be created using the join. Updates to one or more rows of the first dataset or the second dataset may be identified by comparing the first local marker and the second local marker to a stored running tally marker. Rows in the materialized view may be identified corresponding to the one or more rows of the first dataset and the second dataset with the identified updates. The identified rows in the materialized view may be updated based on the identified updates to the one or more rows of the first dataset and the second dataset. The embodiments described herein may identify more than two datasets, track updates to rows in more than the two datasets using local markers. A join may be performed between more than two datasets and a materialized view may be created using the join. A basic join example is set forth with respect to FIGS. 1-6. A one-to-many join example is set forth with respect to FIGS. 7-11. A delete row example is set forth with respect to FIGS. 12-13. An example of a missing value from a row example is set forth with respect to FIGS. 14-18.

FIG. 1 illustrates tracking of updated data using a marker, in accordance with one or more aspects of the disclosure. A first dataset and a second dataset may be identified. In one example, the first dataset and the second dataset may be tables in a database. The datasets may be the base tables where the underlying data is stored. Each table contains a primary key, that is, a unique identifier to identify each row in each of the tables.

Updates to rows in the first dataset may be tracked using a first local marker. An update to a row can correspond to an updated data in that row. For example, an update to a row or an updated data in a row can be a change in value (e.g., characters, text, numbers, etc.) of a data element in a table, or changes to multiple values in the table. The updated data can be achieved as a result of operations or commands such as an "insert," "update," "delete" operation, etc. For example, a "Contact" table in a database can have a column for "Last Name," a column for "City," a column for "State," etc. The data elements in the table can exist in one or more rows of the table. There can be an existing row with a value for the Name as "ABC," the City as "Richmond," and the State as "Virginia." In one example, a user can make an update to the data element by changing the value of the City to "Hampton." In another example, the update to the data can comprise of changing the value of City to "Albany" and State to "New York." In yet another example, an update to the data can comprise of adding a new row to the table, with a new name "XYZ," and other values in the rest of the table. Each of the changes and/or the additions can represent an updated data in the rows of the table. Updates to rows in the second dataset may be tracked using a second local marker. A marker may be data in a particular column in a table used to identify rows that have changed in each of the individual tables. The marker may use data associated with a data type that only allows a value of the data to increase in a monotonic sequence (hereinafter referred to as "monotonically increasing value.") A monotonic sequence is a sequence of numbers where either: 1) the next number is always equal to or higher (e.g., increasing) than the current number, or 2) the next number is always equal to or lower (e.g., decreasing) than the current number, but not both increasing and decreasing within the same sequence of numbers. A monotonically increasing value for a set of values is thus a set of values where the next value of a current value is always equal to or higher than the current value. For an example, i and j are monotonically increasing variables such that $i_n <= i_{n+1}$ and independently $j_n <= j_{n+1}$.s. In other cases, the requirement may be that between transactions, the value of the marker should be strictly greater than any in the prior transaction. The value of the marker may be increased every time a transaction is performed, data in a row is updated, or a new row is added. For example, the types of data to be used as a marker may be a timestamp, a ROWVERSION, a serial, etc. The properties of each data type can vary based on the particular type of data store used. For example, in some database platforms, a timestamp can be an automatically generated binary number that indicates the relative sequence in which data modifications took place in the database. In some other database platforms, a timestamp can represent temporal values that include both date and time. In an example, the current timestamp that is kept in sync with an external reference time can be used for the marker column. In some examples, a ROWVERSION data type is an automatically generated increasing binary number. In some examples, a serial data type can store a sequential integer that is automatically assigned by the database server when a new row is inserted. Each type of database platform may have a data type that is capable of providing monotonically increasing values. A data type with monotonically increasing value is useful to identify a change in data as the values can be compared with each other and a row with a higher value at a later time may indicate a newer data than the row with a same value at a later time.

In some implementations, the data store may be set to use bounded transactions. Bounded transactions may be used to guarantee that the marker remains monotonically increasing. A bounded transaction provides a boundary or restriction on transactions within the data store. For example, a bounded transaction can provide a particular time window within which a transaction is to be completed. Thus, in some examples, a bounded transaction can be a time-limited transaction. Long running transactions cannot guarantee that the marker would remain monotonically increasing. For example, in a conventional scenario, a data store can be configured such that transactions can be open and left open for a long period of time, even indefinitely. A situation may arise when a first user opens a first transaction on one table, starts to update a row or add a new row, and lets the transaction keep waiting without closing it. Meanwhile, a second user can open a second transaction after the first transaction by the first user was opened, update the same table and close the second transaction before the first user closes the first transaction. The marker in the table for the first transaction would have been in the past (e.g., lower in value) compared to marker for the second transaction that was in fact closed earlier than the first transaction. As such, the marker values do not reflect actual transactions in the linear scale of the marker. Therefore, to guarantee true monotonically increasing values for the marker, transactions have to open and close immediately without keeping them open for long periods of time, such that the markers reflect the actual sequence of transactions. In some examples, the data store may be configured to allow an action ("action-limited transaction"), rather than allowing the user to open and close a transaction within a particular period of time. User may not be provided with means to control the transaction time. In an example, there may be limits set as to how many rows of data can be updated or added in each transaction ("size-limited transaction"). The size limits may passively control the amount of time a transaction is allowed to be kept open.

In the example of FIG. 1, a first dataset 101 ("Orders") and a second dataset 102 ("Customers") are shown. The first dataset 101 is shown as a base table containing columns "ID," "Amount," "Customer" and "Marker." The column "Marker" in the "Orders" table is the first local marker, marker column 110, which is used to track updates to rows of the first dataset 101. The second dataset 102 is shown as another base table containing columns "ID," "Name," "Value," and "Marker." The column "Marker" in the "Customers" table is the second local marker, marker column 120, which is used to track updates to rows of the second dataset 102.

The "Marker" columns in each of the tables may use data of any data type with a monotonically increasing value. The data type assignment can vary per table or it can be set system wide. For example, the "Marker" column in the "Orders" table (e.g., marker column 110) may use the monotonically increasing values $i_1$, $i_2$, $i_3$, etc. In an example, $i_2=i_1+1$, $i_3=i_2+1$, etc. That is, each value of the marker may be increased by a value of 1 for the next value of the marker (e.g., an updated value at a later time) as a way of ensuring that successive values of the marker are monotonically increasing. Each time a row on the "Orders" table is updated or inserted, marker column 110 is updated or inserted with the next increased value for the marker in that row. An example of values of the marker column 110 for the "Orders" table maybe $i_1=1$, $i_2=2$, $i_3=3$, etc. Another example maybe $i_1=X$, $i_2=Y$, $i_3=Z$, $j_1=T$, $j_2=U$, and $j_1=T$, etc. Similarly, the "Marker" column in the "Customers" table (e.g., marker column 120) may use values $j_1$, $j_2$, etc. In an example, $j_2=j_1+1$, etc. That is, each value of the marker may be increased by a value of 1 for the next value (e.g., updated value) of the marker so that the successive values are monotonically increasing. Alternatively, each value of the marker may be increased by a value other than "1" so long as the value does increase. In an example, j1=<timestamp>, j2=<timestamp> such that j1<j2. Each time a row on the "Customers" table is updated or inserted, the "Marker" column is updated or inserted with the next increased value for the marker in that row. An example of marker values for the "Customers" table maybe $j_1=5$, $j_2=6$, etc. Another example maybe $j_1=T$, $j_2=U$, etc. In other cases, a timestamp can be used for the marker, assuming the time stamp increases in value as described herein. Thus, the marker values for the "Orders" table and the "Customers" table can be updated independently from each other. Additionally, the View Persister 103 shown in FIG. 1 may perform one or all of the operations described with respect to FIGS. 1-6.

Figure 2:
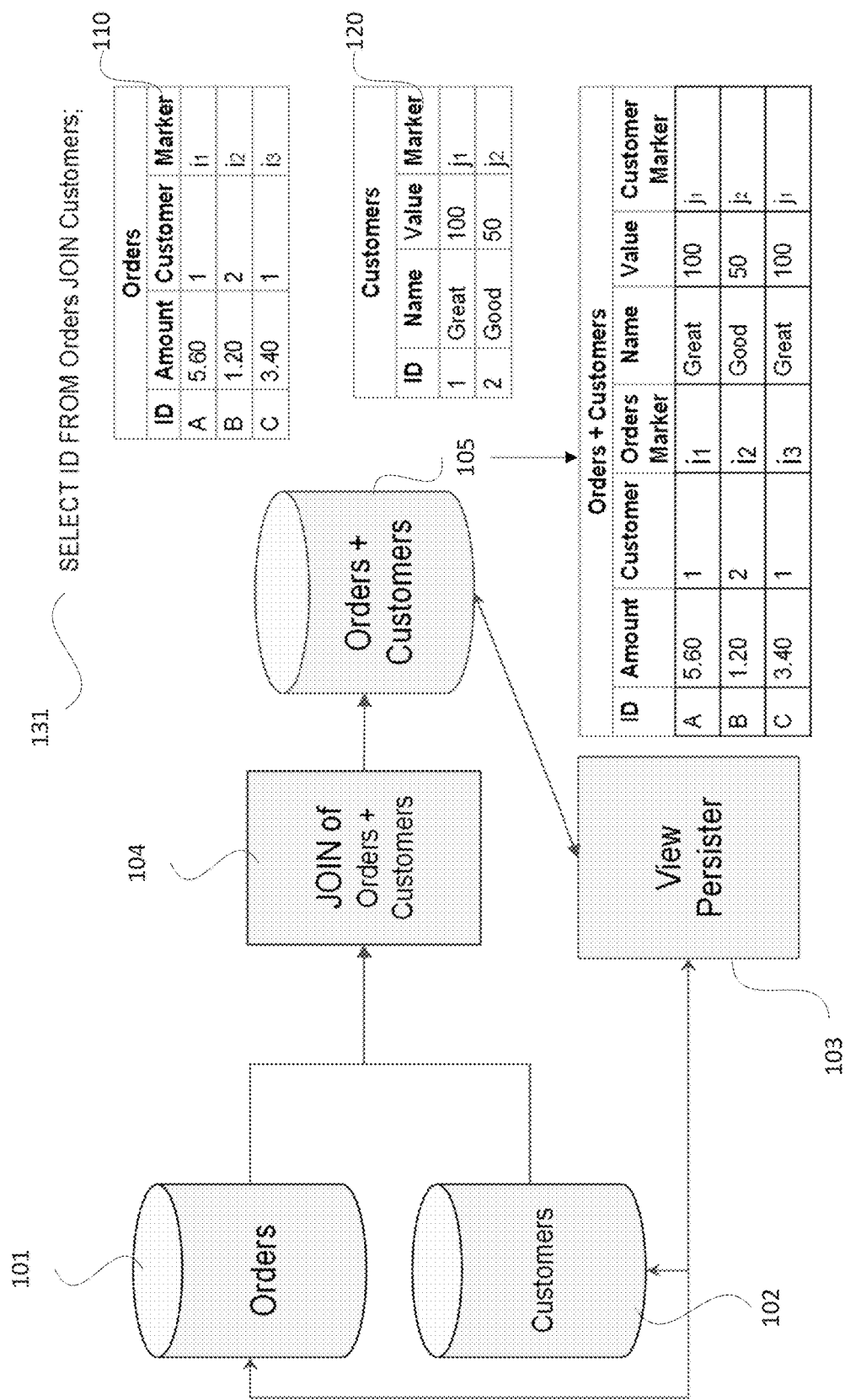
FIG. 2 illustrates populating a view with a marker, in accordance with one or more aspects of the disclosure.

FIG. 2 illustrates populating a view with a marker, in accordance with one or more aspects of the disclosure. A join between the first dataset and the second dataset may be performed. A materialized view may be created using the join. The join includes data corresponding to the first local marker and the second local marker, and as such the materialized view includes the same. That is, the materialized view is populated with the marker for each joined table in the view (e.g., "Orders Marker" and "Customer Marker"). Once the view is populated, the system keeps track of the latest (e.g., highest) value of the marker that appears on the view. The system may store a separate metadata, such as a running tally marker (not shown), to keep track of the highest value of the marker. In some examples, a separate running tally marker may be tracked for each table. In the case of one-to-many aggregations, an aggregation function (e.g., MAX( ) function) is to be used to identify the value of the running tally marker. An example of the one-to-many join is described below with respect to FIGS. 7-11.

In the example shown in FIG. 2, a join is performed between the first data set 101 and second data set 102 (e.g., "Orders" table and the "Customers" table), as depicted in the figure using join 104 ("JOIN of Orders+Customers"). A materialized view 105 is populated using the join, as depicted in the figure using "Orders+Customers" view. A select transaction may be used to populate the view, as depicted in the figure using the query 131 ("SELECT ID FROM Orders JOIN Customers"). The data in the view is depicted in a table format, where all the rows of the two joined datasets 101 and 102 (e.g., tables "Orders" and "Customers") appear on the view, including the markers 110 and 120 from each joined tables as "Orders Marker" and "Customer Marker" with the corresponding marker values within view 105. The system may identify the latest (e.g., highest) marker for each of the tables using a local running tally marker. For example, the system may identify $j_2$ as the latest marker for the "Orders" table as the local running tally marker for the table.

Figure 3:
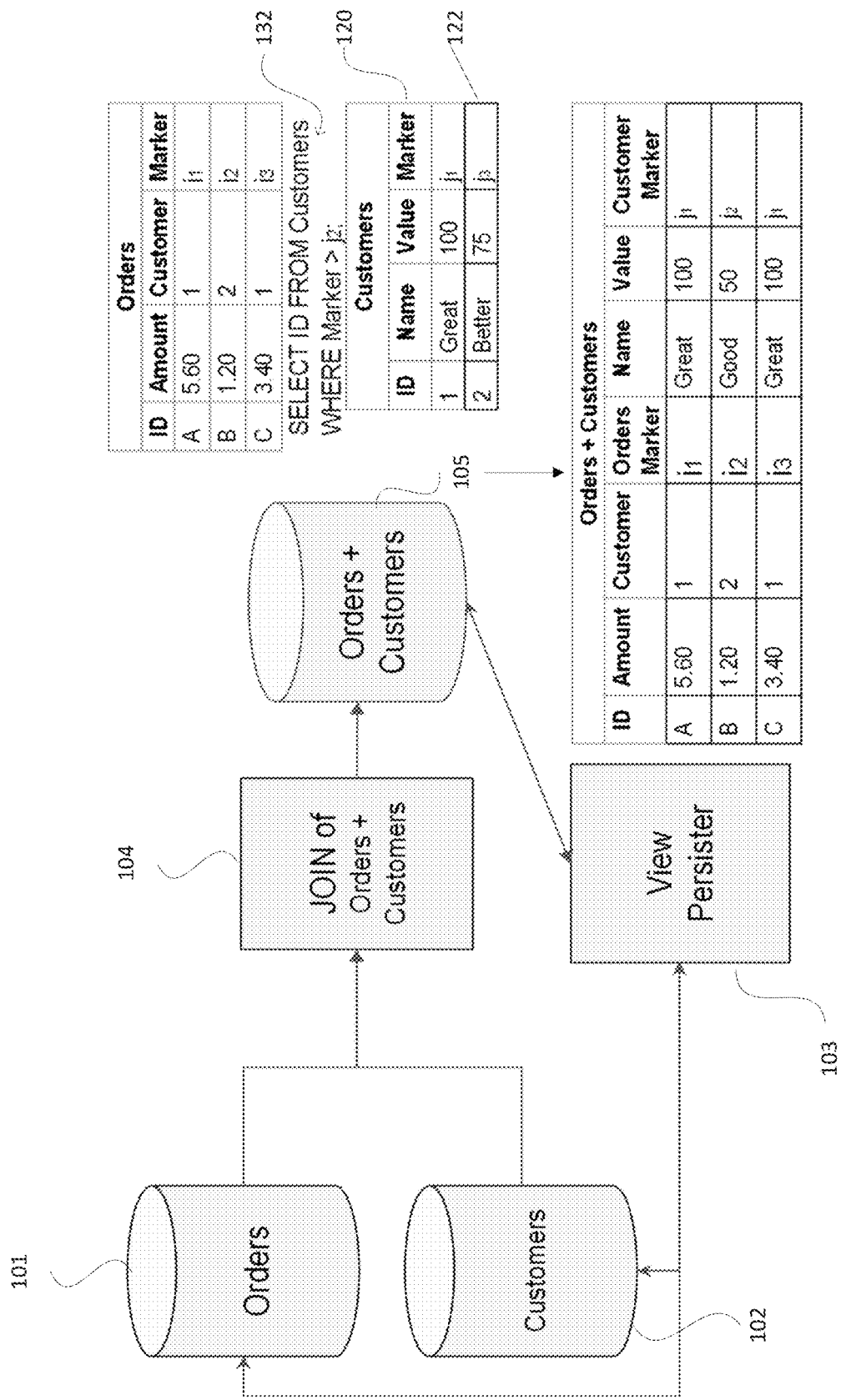
FIG. 3 illustrates querying joined tables for changes using a marker, in accordance with one or more aspects of the disclosure.

FIG. 3 illustrates querying joined tables for identifying changes using a marker, in accordance with one or more aspects of the disclosure. Updates (e.g., changes) to data in one or more rows of the first dataset and/or the second dataset may be identified. In some examples, the identification may be done by comparing the first local marker and the second local marker to a stored running tally marker. The stored running tally marker may be a global marker (e.g., used across multiple datasets), or a local marker for each dataset. FIG. 3 depicts the state of the data at a later time (assume "T2") than the state of the data shown for an earlier time (assume "T1") in FIG. 2. In the example of FIG. 3, it is depicted that there was an update to dataset 102 (the "Customers" table) for the second row 122 with ID=2 as compared to the data shown in FIG. 2 at time T1. The "Name" column data was changed from "Good" to "Better," the "Value" column data was changed from 50 to 75, and the "Marker" column 120 data was updated from "$j_2$" to "$j_3$." The update was performed on the base table that was joined, that is, the dataset 102 ("Customers" table). However, as depicted, the materialized view 105 of "Orders+Customers" does not reflect this update yet at time T2 depicted in FIG. 3. The system may query the joined tables "Orders" and "Customers" to identify any updates to the tables since the materialized view was created. The system may identify updates to data in one or more rows of "Orders" and "Customers" table. The identification may be performed by comparing the "Marker" column values of each table to the stored running tally marker. For example, the system may have identified and stored $j_2$ as the latest local running tally marker for the "Customers" table. In the example, the "Customers" table (e.g., dataset 102) may be queried to identify any updates to data in the table by comparing values in the "Marker" column 120 to the stored local running tally marker having the value $j_2$. The query may identify values in the "Marker" column 120 that are greater than the stored local running tally marker (e.g., value $j_2$), indicating that the marker was updated after storing the tally marker. As an example, the query is depicted as query 132 ("SELECT ID FROM Customers WHERE Marker>$j_2$") to identify each row ID number(s) from the Customers table where Marker values are greater than the stored local running tally marker value $j_2$. The query 132 returns the second row of the "Customers" table with ID=2, as the "Marker" value for the second row is "$j_3$" which is greater than tally marker value "$j_2$." Thus, an update to one of the rows of the "Customer" table from time T1 to time T2 is identified by comparing the local marker to the tally marker.

Figure 4:
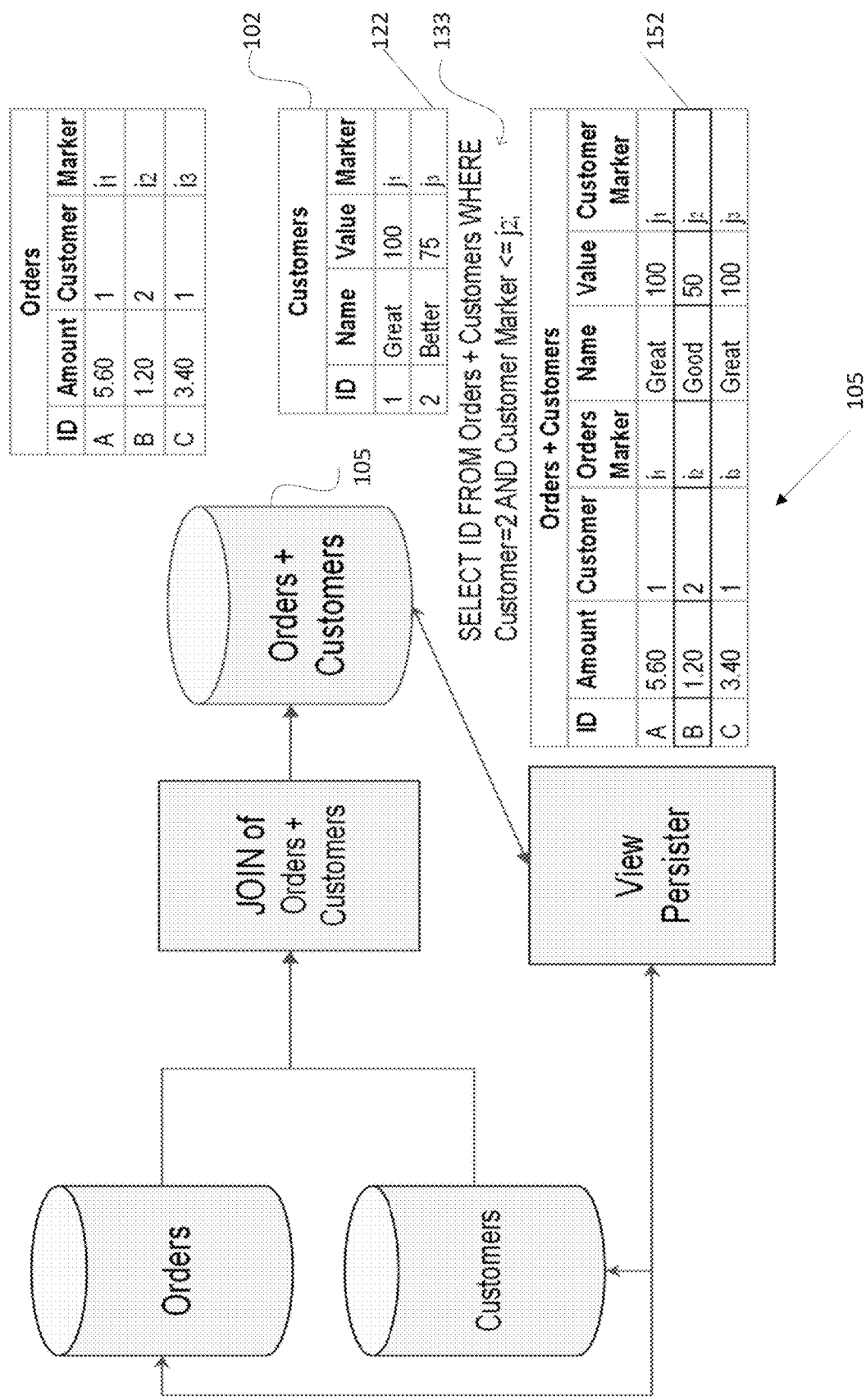
FIG. 4 illustrates querying for primary keys in a base table, in accordance with one or more aspects of the disclosure.

FIG. 4 illustrates querying for primary keys in a base table, in accordance with one or more aspects of the disclosure. Rows in the materialized view may be identified corresponding to the one or more rows of the first dataset and/or the second dataset with the identified updates. In the example of FIG. 4, rows in the materialized view 105 ("Orders+Customers") corresponding to the identified updated row 122 of the "Customers" table is identified. The updated row 122 of the "Customers" table 102 was the second row with the primary key ID=2. Thus the materialized view 105 is queried to identify the primary key of the base table "Orders" available in the materialized view 105 corresponding to the identified updated row 122 using the extracted value of ID=2 to be used in the Customer column, and where the marker value is less than or equal to the running tally marker. As an example, the query 133 to identify the base table is depicted as "SELECT ID FROM Orders+Customers WHERE Customer=2 AND Customer Marker<=j2" to return ID column values in view 105 ("Orders+Customers") where Customer value is 2 and Customer Marker value is less than or equal to j2, which represents an outdated marker value for Customer table. The ID value that is returned is "B" from row 152 of view 105.

Figure 5:
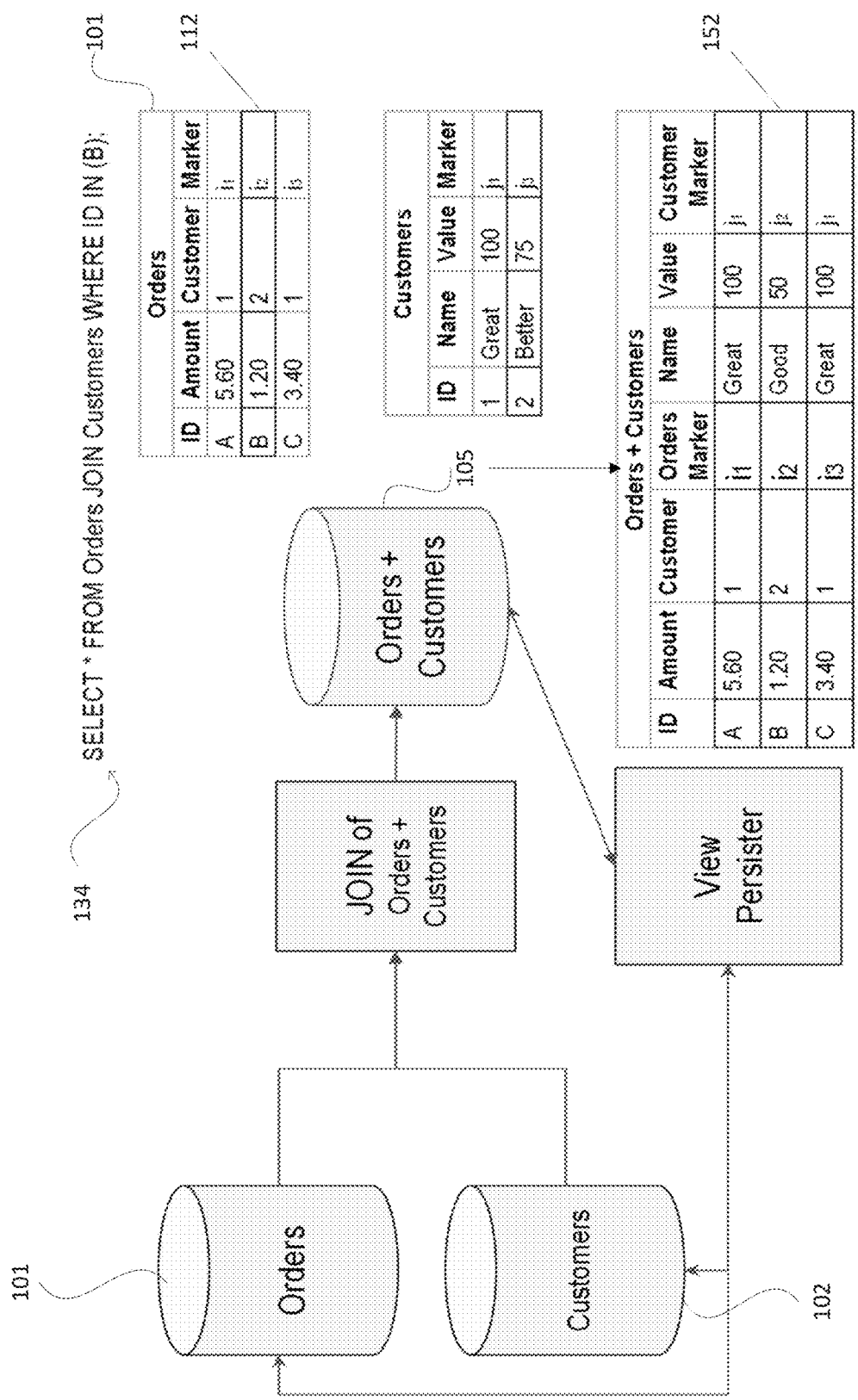
FIG. 5 illustrates selecting updated rows using primary keys of base table, in accordance with one or more aspects of the disclosure.

FIG. 5 illustrates selecting updated rows using primary keys of base table, in accordance with one or more aspects of the disclosure. The example depicts performing an updated join between the first dataset 101 and the second dataset 102 that is limited to the rows identified (e.g., using the resultant primary key values) from the materialized view. The identified row in the materialized view 105 was the second row 152 of the view, with ID=B. Thus an updated join is performed between "Orders" and "Customers" table, but is limited to where the row with the value of primary key ID=B in the "Orders" table 101. As an example, the query 134 is depicted as "SELECT*FROM Orders JOIN Customers WHERE ID IN (B)." The query 134 returns all columns if the tables Orders joined with Customers where ID includes B.

Figure 6:
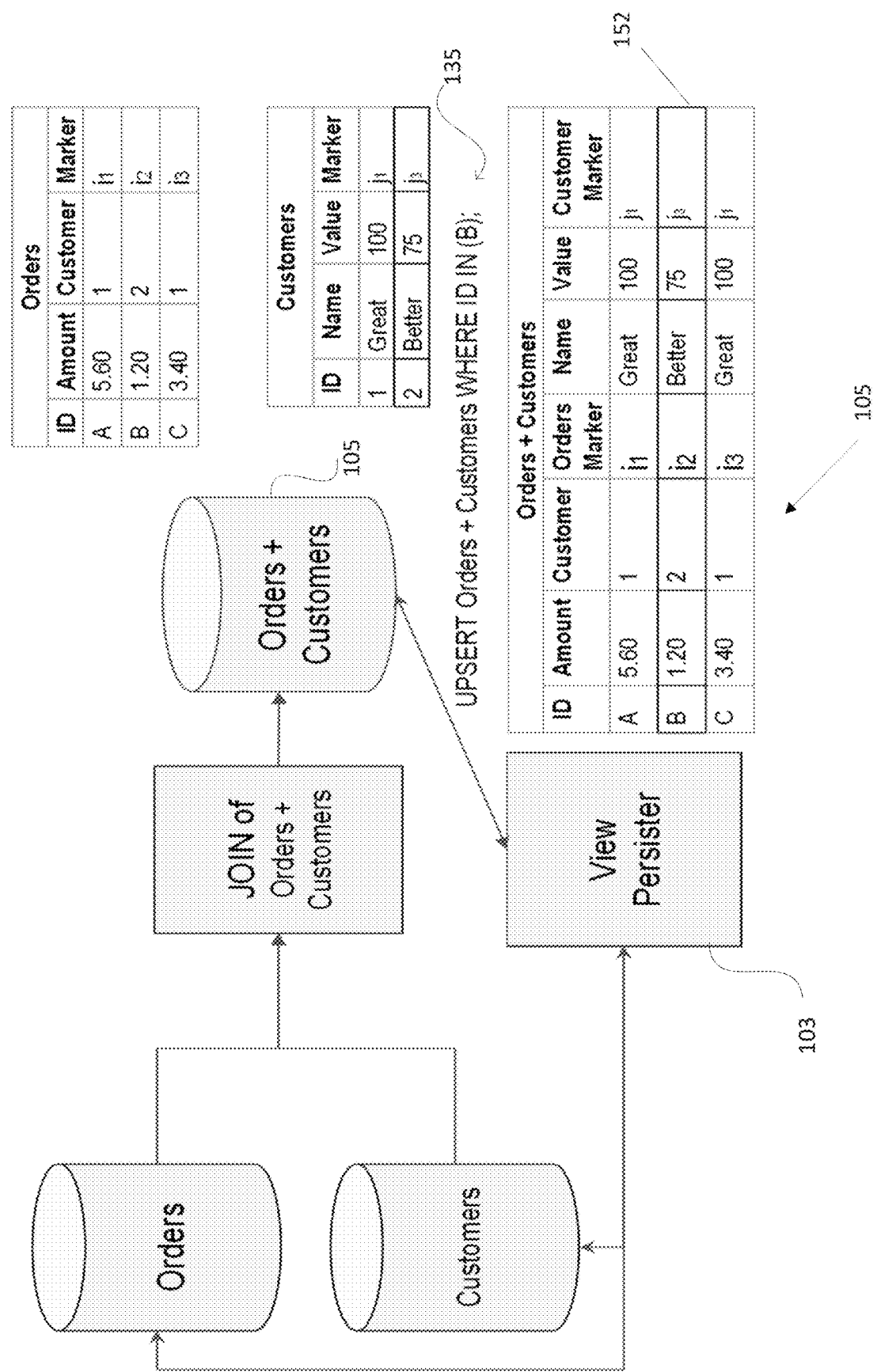
FIG. 6 illustrates presenting updated rows, in accordance with one or more aspects of the disclosure.

FIG. 6 illustrates presenting updated rows, in accordance with one or more aspects of the disclosure. The identified rows in the materialized view 105 may be update based on the identified updates to the one or more rows of the first dataset 101 and/or the second dataset 102. In the example, the results of the join for the updated rows in the base table may be used to update the materialized view. The identified row in the materialized view 105 was the second row 152 with ID=B in the materialized view 105 "Orders+Customers." Thus, the row 152 in the materialized view with ID=B is updated with the values derived from the base tables based on the updated join between the base tables. As an example, the query 135 is depicted as "UPSERT Orders+Customers WHERE ID IN (B)." The view 105 is thus updated with the updated values from the base tables for impacted rows of the materialized view 105 without having to perform the join using all values of the base tables. After the update, the updated view has the row 152 with ID=B where the value of "Name" column changed from "Good" to "Better" and the value of "Value" column changed from "50" to "75" as a result of updates in the base tables.

Additionally, the system may update the running tally marker once the materialized view has been updated. The tally value may be updated for each of the datasets with the latest marker value for each dataset. For example, the local running tally marker for the "Customers" table may be updated with "$j_3$" after the materialized value has been updated, as that is the highest value of the marker for the "Customers" table at the time that is depicted in FIG. 6 (assume "T3).

In one implementation, the process performed by the view persister 103 can be triggered based on an update to a dataset used in a view. For example, if a data in a row of a table that is used in a view is updated by a user, the process may be triggered. In another implementation, the process can be run on an ad hoc basis. That is, the process may be manually triggered when a user intends to obtain any updates to the view. In another implementation, the process can be performed on a scheduled basis. That is, a scheduled job may be set up to run the process in a specified frequency of time.

As described above, a separate running tally marker may be tracked for each table. In the case of one-to-many aggregations, the same tracking of markers is done in all tables. The join results in multiple markers from the joined table. The an aggregation function (e.g., MAX( ) function) can be used to identify the value of the running tally marker. A one-to-many join example is set forth with respect to FIGS. 7-11.

Figure 7:
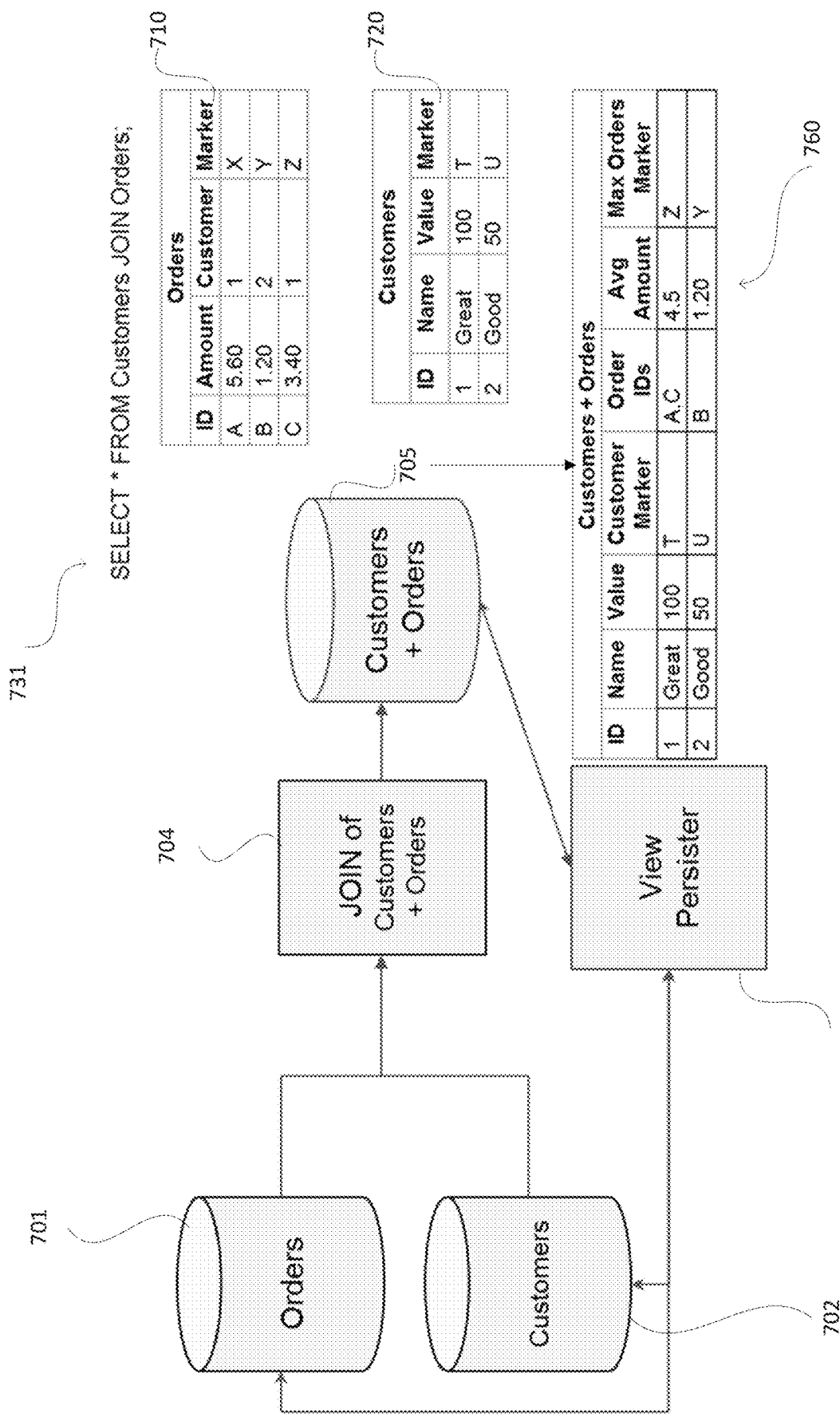
FIG. 7 illustrates populating a materialized view with a marker for each joined table in the view, in accordance with one or more aspects of the disclosure.

FIG. 7 illustrates populating a materialized view with a marker for each joined table in the view, in accordance with one or more aspects of the disclosure. In the example shown in FIG. 7, a join is performed between the "Orders" table 701 and the "Customers" table 702, as depicted in the figure using the join 704 representing "JOIN of Customers+Orders." A materialized view 705 is populated using the join 704, as depicted in the figure using "Customers+Orders" view. A select transaction may be used to populate the view, as depicted in the figure using the query 731 represented as "SELECT ID FROM Orders JOIN Customers." The data in the view is depicted in a table format 760, where all the rows of the two joined tables "Orders" 701 and "Customers" 702 appear on the view, including the markers 710 and 720 from each joined tables as "Orders Marker" and "Customer Marker" with the corresponding marker values. The system can keep the markers as an array for completeness or the markers can be aggregated with an aggregation function, such as the MAX( ) function. The system may identify a maximum marker. For example, the system may identify Z and Y as the maximum orders marker for respective customer markers T and U.

Figure 8:
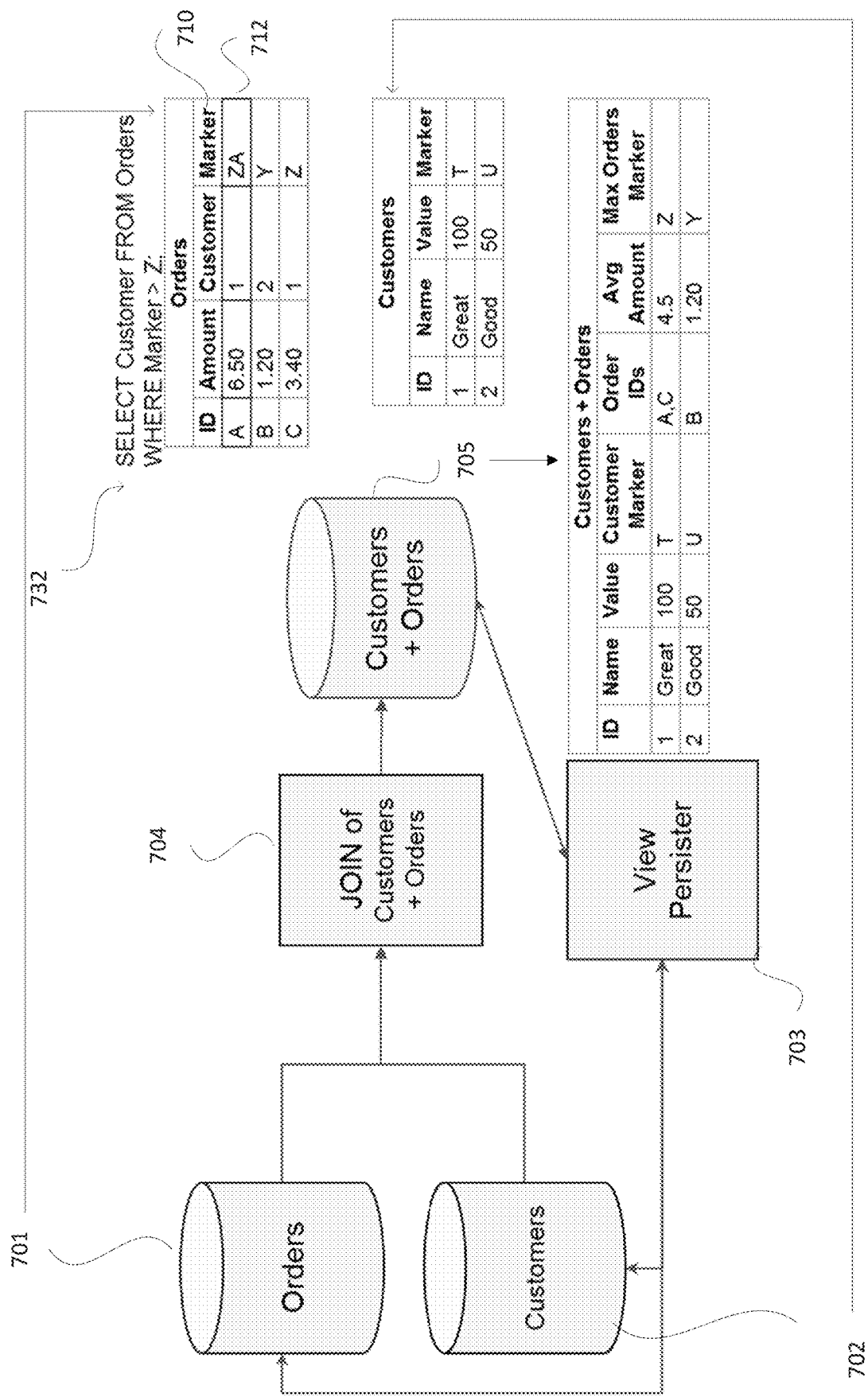
FIG. 8 illustrates querying joined tables for changes using a marker, in accordance with one or more aspects of the disclosure.

FIG. 8 illustrates querying joined tables for changes using a marker, in accordance with one or more aspects of the disclosure. Updates (e.g., changes) to data in one or more rows of the first dataset and the second dataset may be identified. In some examples, the identification may be done by comparing the first local marker and the second local marker to a stored running tally marker. The stored running tally marker may be a global marker (e.g., used across multiple datasets), or a local marker for each dataset. In the example of FIG. 8, it is depicted that there was an update to the "Orders" table for the first row 712 with ID=A. The "Amount" column was changed from 5.60 to 6.50, and the "Marker" was updated from "X" to "ZA." The update was performed on the base table that was joined, that is, the "Orders" table 701. However, as depicted, the materialized view 705 of "Customer+Orders" does not reflect this updated yet. The system may query the joined tables "Orders" 701 and "Customers" 702 to identify any updates to the tables since the materialized view 705 was created. The system may identify updates to one or more rows of "Orders"701 and "Customers" 702 table. The identification may be performed by comparing the "Marker" column values of each table to the stored running tally marker. For example, the system may have identified and stored Z as the latest local running tally marker for the "Orders" table 701. In the example, the "Orders" table 701 may be queried to identify any updates to the table by comparing values in the "Marker" column 710 to the stored local running tally marker having the value Z. The query may identify values in the "Marker" column that are greater than the stored local running tally marker, indicating that the marker was updated after storing the tally marker. As an example, the query 732 is depicted as "SELECT Customer FROM Orders WHERE Marker>Z." The query returns the first row 712 of the "Orders" table with ID=A, as the "Marker" 710 value for the first row is "ZA," which is greater than tally marker value "Z." Thus, an update to one of the rows of the "Orders" table is identified by comparing the local marker to the tally marker.

Figure 9:
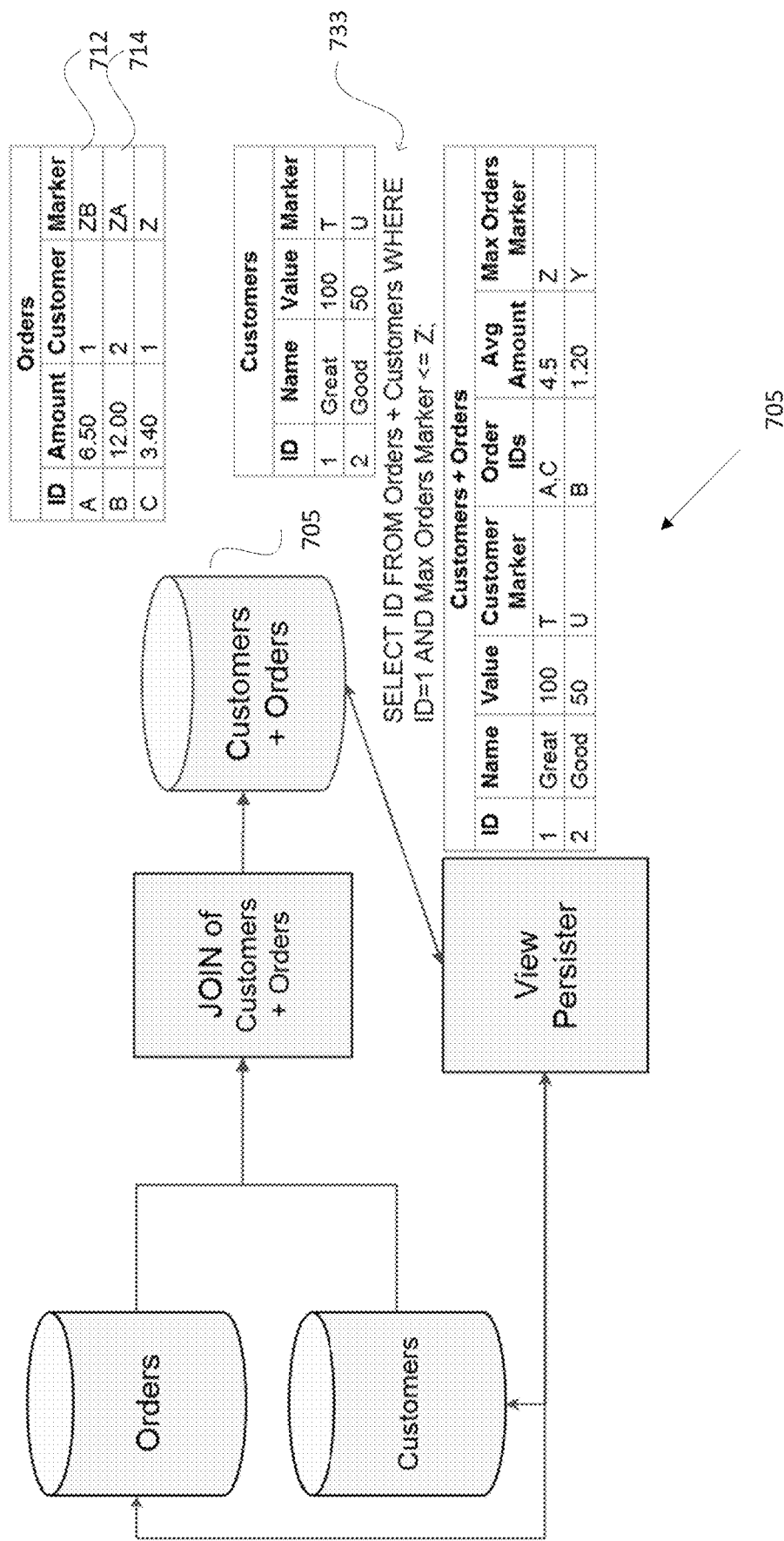
FIG. 9 illustrates a query materialized view for primary keys of the base table of each row that changed in each of the joined tables using extracted values and the marker, in accordance with one or more aspects of the disclosure.

FIG. 9 illustrates a query materialized view for primary keys of the base table of each row that changed in each of the joined tables using extracted values and the marker, in accordance with one or more aspects of the disclosure. Rows in the materialized view may be identified corresponding to the one or more rows of the first dataset and the second dataset with the identified updates. In the example of FIG. 9, rows in the materialized view 705 "Customers+Orders" corresponding to the identified updated rows of the "Orders" table is identified. The updated rows of the "Orders" table were the first row 712 with the primary key ID=A and the second row 714 with the primary key ID=B. Thus the materialized view 705 is queried to identify the primary key of the base table "Customers" in the materialized view corresponding to the identified updated rows using the extracted value of ID=A and ID=B where the marker value is less than or equal to the previously seen running tally marker. As an example, the query 733 is depicted as "SELECT ID FROM Orders+Customers WHERE ID=1 AND Max Orders Marker<=Z."

Figure 10:
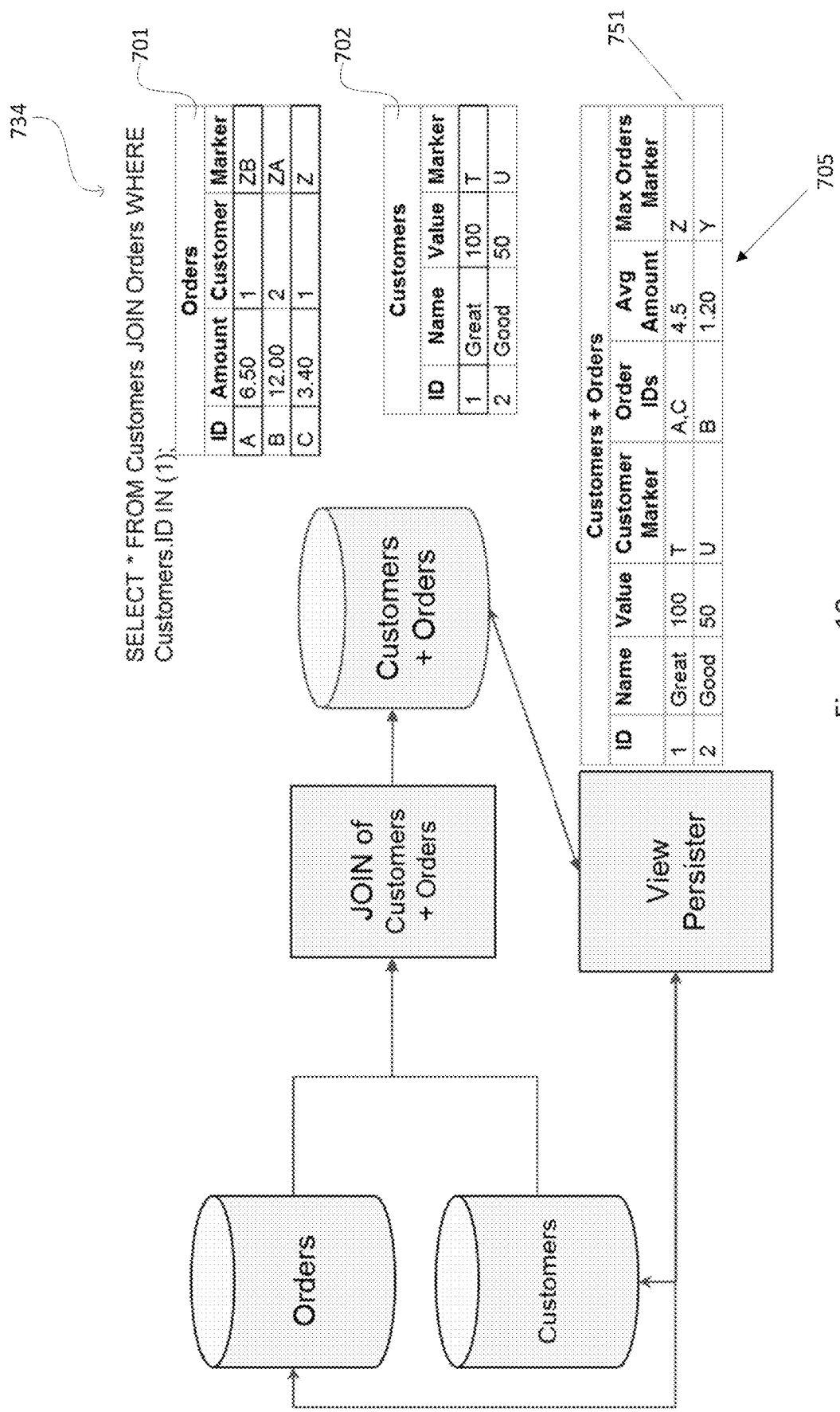
FIG. 10 illustrates selecting updated rows using primary keys of base table, in accordance with one or more aspects of the disclosure.

FIG. 10 illustrates selecting updated rows using primary keys of base table, in accordance with one or more aspects of the disclosure. The example depicts performing an updated join between the first dataset and the second dataset that is limited to the rows identified (e.g., using the resultant primary key values) from the materialized view. The identified row in the materialized view 705 was the first row 751 of the view 705 with ID=1. Thus an updated join is performed between "Orders" 701 and "Customers" 702 table for the row with the value of primary key ID=1 in the "Customers" 702 table. As an example, the query 734 is depicted as "SELECT*FROM Customers JOIN Orders WHERE Customers.ID IN (1)."

Figure 11:
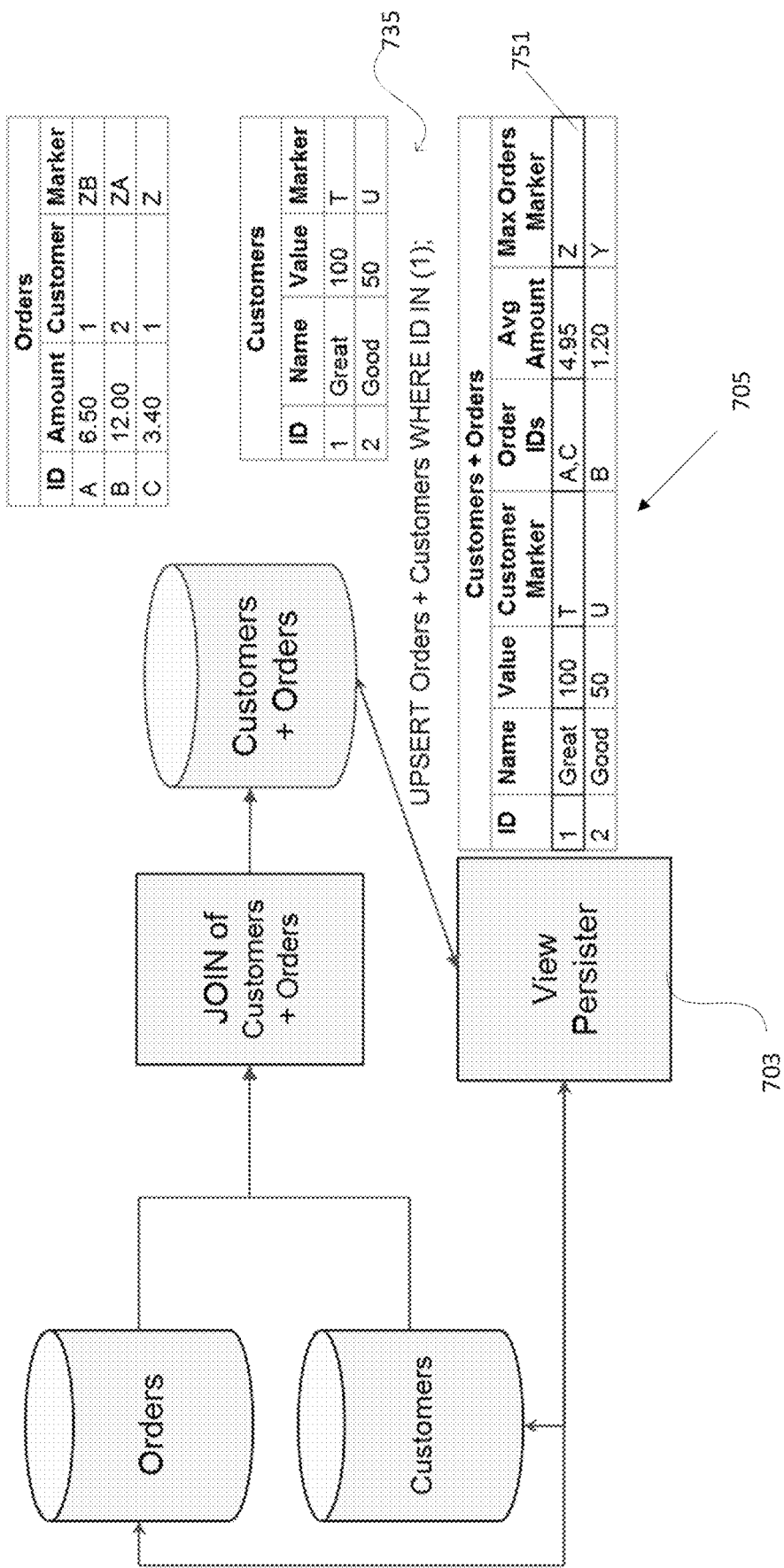
FIG. 11 illustrates presenting updated rows with updated markers, in accordance with one or more aspects of the disclosure.

FIG. 11 illustrates presenting updated rows with updated markers, in accordance with one or more aspects of the disclosure. The identified rows in the materialized view may be updates based on the identified updates to the one or more rows of the first dataset and the second dataset. In the example, the results of the join for the updated rows in the base table may be used to update the materialized view. The identified row in the materialized view was the first row 751 with ID=1 in the materialized view "Customers+Orders." Thus, the row 751 in the materialized view with ID=1 is updated with the values derived from the base tables based on the updated join between the base tables. As an example, the query 735 is depicted as "UPSERT Orders+Customers WHERE ID IN (1)." The view 705 is thus updated with the updated values from the base tables for impacted rows of the materialized view without having to perform the join using all values of the base tables. The updated view has the row 751 with ID=1 where the value of "Avg Amount" column changed from "4.5" to "4.95" as a result of updates in the base tables.

In one implementation, the process performed by the view persister 703 can be triggered based on an update to a dataset used in a view. For example, if a data in a row of a table that is used in a view is updated by a user, the process may be triggered. In another implementation, the process can be run on an ad hoc basis. That is, the process may be manually triggered when a user intends to obtain any updates to the view. In another implementation, the process can be performed on a scheduled basis. That is, a scheduled job may be set up to run the process in a specified frequency of time.

Deleted rows from one of the base tables or joined tables can also be tracked. In a delete row example, markers are in place and a materialized view is populated. The delete handling includes deleting from the joined table and querying joined tables for deleted rows. The deleted rows can be tracked using a separate table using a TRIGGER/RULE to auto-populate on delete. Alternatively, the deleted rows can be tracked by a flag in the existing table. The remaining process can be similar to that of an updated row or an added row as described herein. A delete row example is set forth with respect to FIGS. 12-13.

Figure 12:
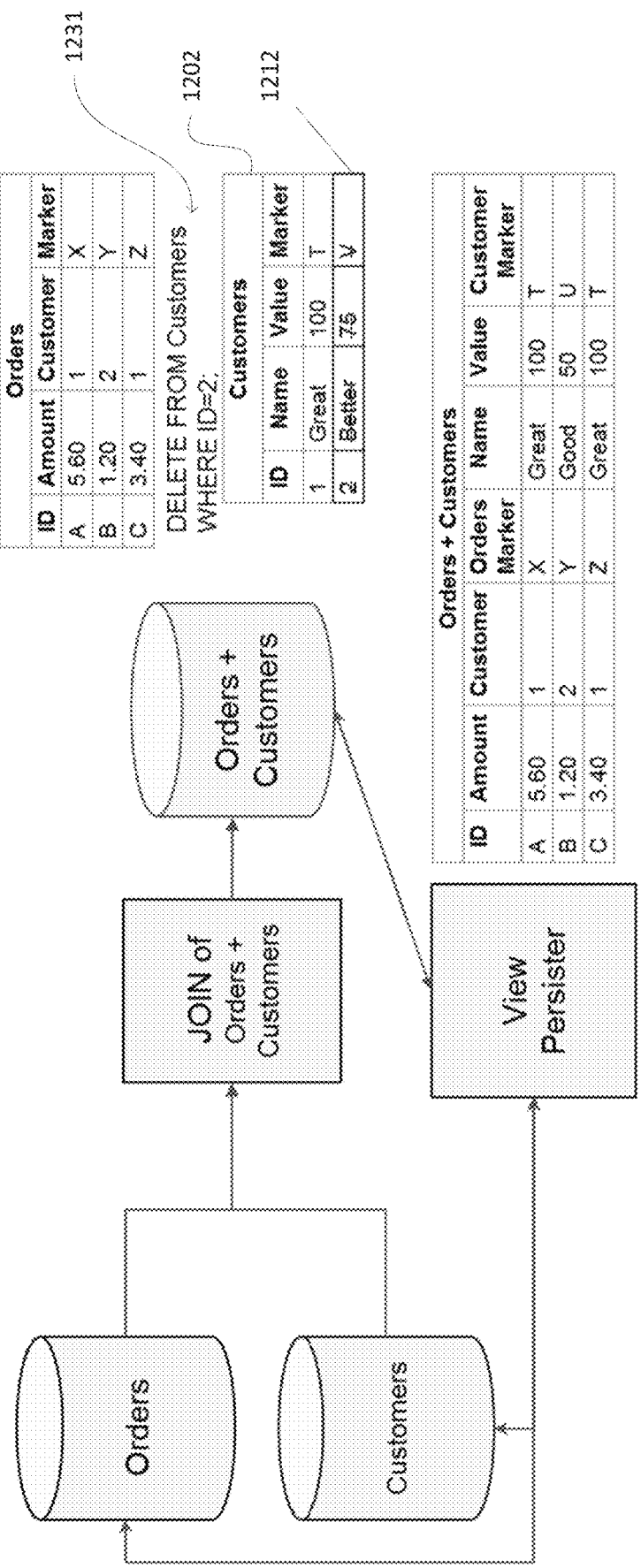
FIG. 12 illustrates a delete row from a joined table, in accordance with one or more aspects of the disclosure.

FIG. 12 illustrates a deleted row from a joined table, in accordance with one or more aspects of the disclosure. In the example of FIG. 12, it is depicted that the second row 1212 of the Customers table 1202 is deleted. For example, the query 1231 can be DELETE FROM Customers where ID=2.

Figure 13:
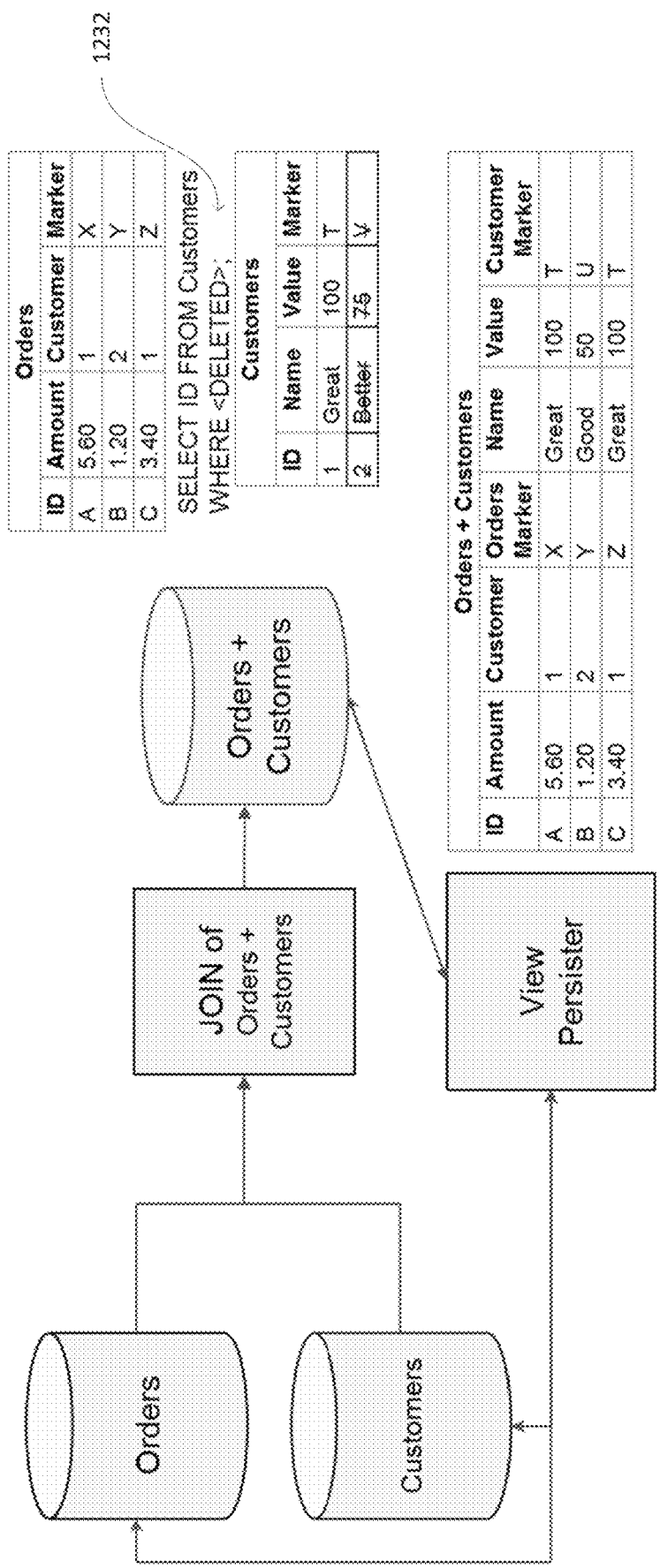
FIG. 13 illustrates querying joined tables for identifiers of deleted rows, in accordance with one or more aspects of the disclosure.

FIG. 13 illustrates querying joined tables for identifiers of deleted rows, in accordance with one or more aspects of the disclosure. In the example of FIG. 13, the joined tables can be queried for identifiers of the deleted rows. For example, the query 1232 can be SELECT ID FROM Customers WHERE<DELETED>. As described above, the deleted rows can be tracked using a separate table that is auto-populated on delete or the deleted rows can be tracked as flags in the existing table. The deleted rows need to have a marker like updated rows or added rows. The remaining process to update the materialized view is similar to the process when there is an updated or added row.

There are some cases where there may be one or more missing values from one or more rows. The missing-value example assumes markers are in place and this is part of the process for populating the materialized view. In this example, there is no value or marker when there is no match in the joined table. A change detection process cannot detect which rows need to have values added since there is no information. This is solved by adding values from the base table and marker from the base table if it is a system wide marker, like a timestamp. The MAX marker from the joined table change so detection can work when a row is added that would populate the joined values. This process can be referred to as "backlinking" since it links the missing rows from the joined table back to the corresponding row in the base table. An example of a missing value from a row example is set forth with respect to FIGS. 14-18.

Figure 14:
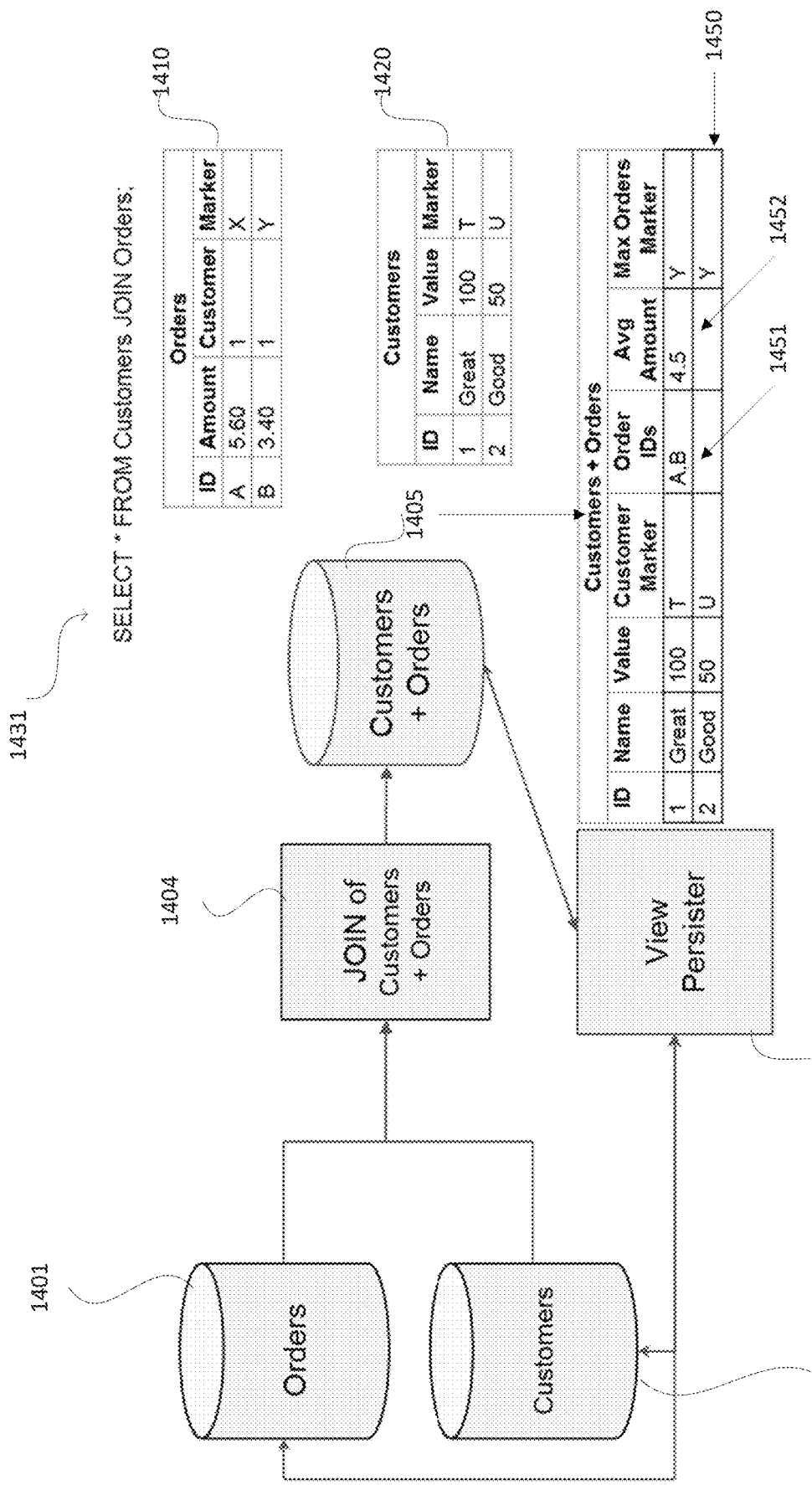
FIG. 14 illustrates populating a materialized view with a marker for each joined table in the view, in accordance with one or more aspects of the disclosure.

FIG. 14 illustrates populating a materialized view with a marker for each joined table in the view, in accordance with one or more aspects of the disclosure. In the example shown in FIG. 14, a join is performed between the "Orders" table 1401 and the "Customers" table 1402, as depicted in the figure using join 1404 represented as "JOIN of Customers+ Orders." A materialized view 1405 is populated using the join 1404, as depicted in the figure using "Customers+ Orders" view. A select transaction may be used to populate the view, as depicted in the figure using the query 1431 as "SELECT*FROM Customers JOIN Orders." The data in the view is depicted in a table format, where all the rows of the two joined tables "Orders" 1401 and "Customers" 1402 appear on the view 1405, including the markers 1410 and 1420 from each joined tables as "Orders Marker" and "Customer Marker" with the corresponding marker values. The system can keep the markers as an array for completeness or the markers can be aggregated with an aggregation function, such as the MAX( ) function. The system may identify a maximum marker. For example, the system may identify Y and Y as the maximum orders marker for respective customer markers T and U. In this example, there are missing values 1451 and 1452 for the Order IDs and the Average amount in the second row 1450.

Figure 15:
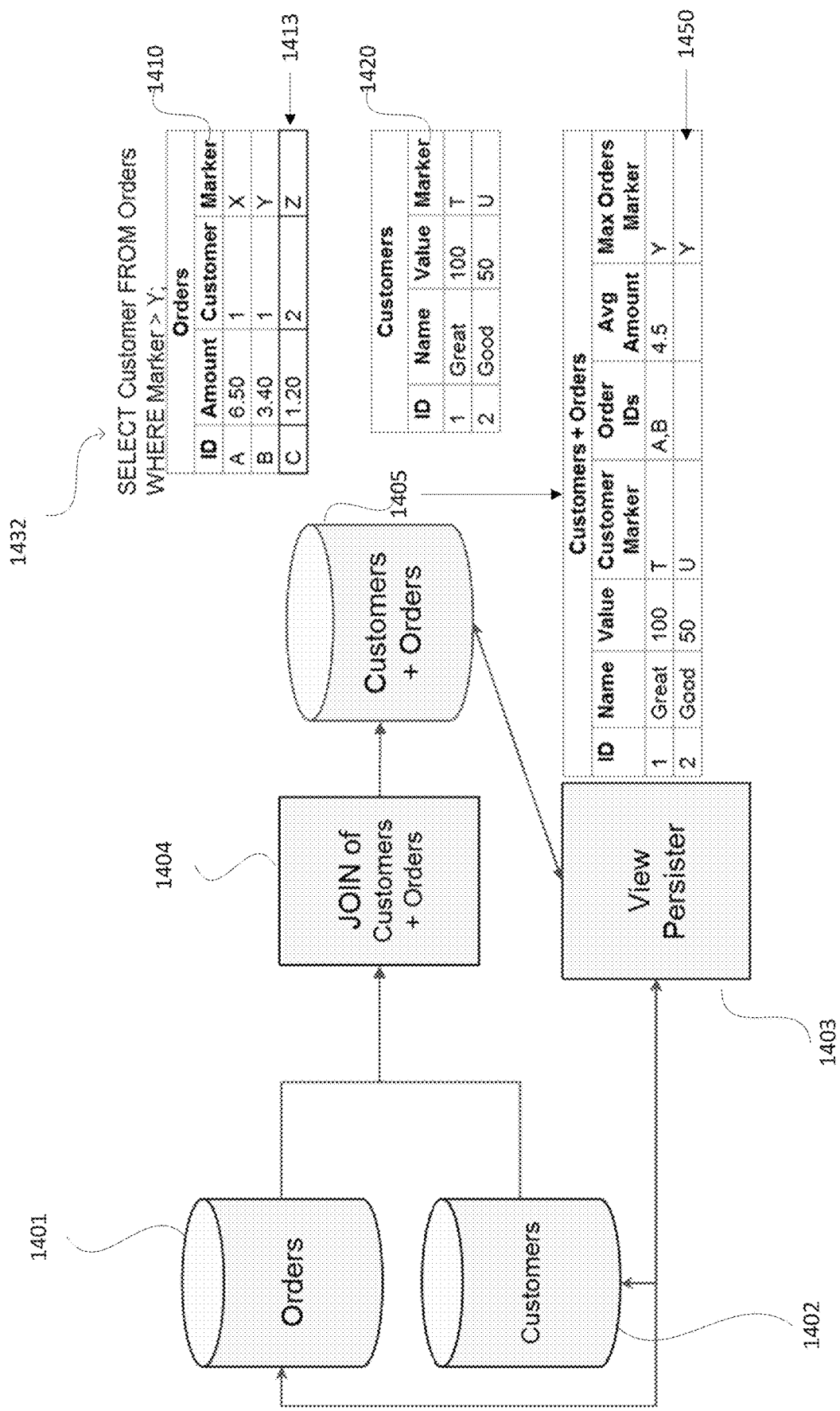
FIG. 15 illustrates querying joined tables for changes using a marker, in accordance with one or more aspects of the disclosure.

FIG. 15 illustrates querying joined tables for changes using a marker, in accordance with one or more aspects of the disclosure. To populate the missing values for the order identifiers, the base table Orders is to be queried using the MAX marker in the materialized view. That is, the system may query the base table "Orders" 1401 to identify any updates to the tables since the materialized view 1405 was created. The system may identify updates to data in one or more rows of the "Orders" 1401 and "Customers" 1402 tables. The identification may be performed by comparing the stored running tally marker (e.g., Y) to the "Marker" column values of the "Orders" and "Customers" tables. In the example, the "Orders" table 1401 may be queried to identify any updates to the table by comparing the stored local running tally marker having the value Y to values in the "Marker" column 1410. The query may identify values in the "Marker" column 1410 that are greater than the stored local running tally marker, indicating that the marker was updated after storing the tally marker. As an example, the query 1432 is depicted as "SELECT Customer FROM Orders WHERE Marker>Y." The query returns the third row 1413 of the "Orders" table 1401 with ID=C, as the "Marker" value for the third row 1413 is "Z," which is greater than tally marker value "Y." Thus, an update to one of the rows of the "Orders" table is identified by comparing the local marker to the tally marker.

In the example of FIG. 15, it is depicted that there was an added row 1413 to the "Customers" table for the third row with ID=C. The "Amount" is 1.2, the Customer ID is 2, and the "Marker" was populated with "Z." The added row 1413 was added on the base table that was joined, that is, the "Orders" table 1401.

Figure 16:
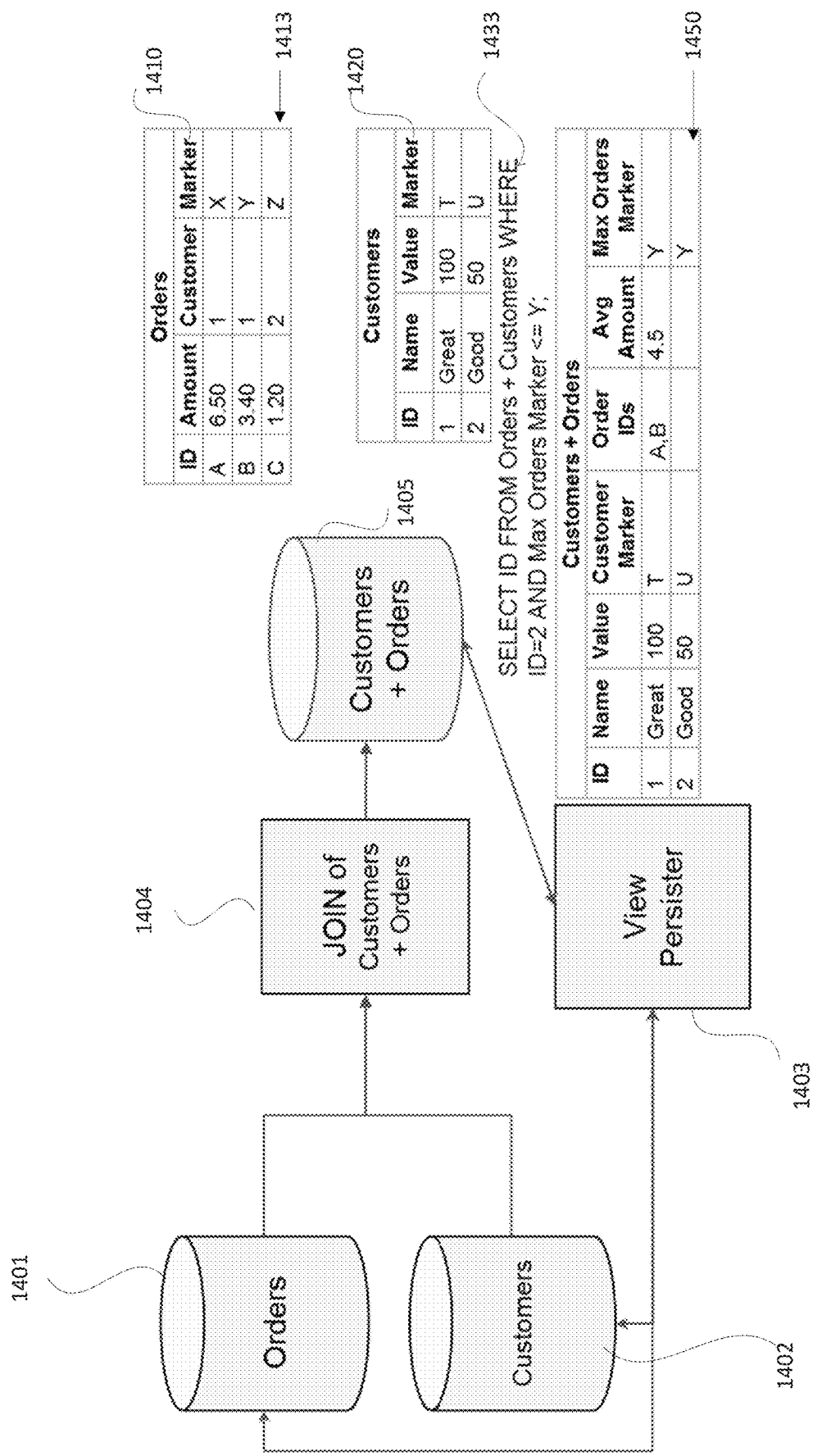
FIG. 16 illustrates a query materialized view for primary keys of the base table of each row that changed in each of the joined tables using extracted values and the marker, in accordance with one or more aspects of the disclosure.

FIG. 16 illustrates a query materialized view for primary keys of the base table of each row that changed in each of the joined tables using extracted values and the marker, in accordance with one or more aspects of the disclosure. Rows in the materialized view may be identified corresponding to the one or more rows of the first dataset and the second dataset with the identified updates. That is, the materialized view can be queried for primary keys of the base table of each row that changed in each of the joined tables using extracted values and the marker. In the example of FIG. 16, rows in the materialized view 1405 ("Customers+Orders") corresponding to the identified updated rows of the "Orders" table are identified. The updated row of the "Orders" table was the third row 1413 with the primary key ID=C. Thus the materialized view 1405 is queried to identify the primary key of the base table "Customers" in the materialized view corresponding to the identified updated row 1413 using the extracted value of ID=C where the marker value is less than or equal to the previously seen running tally marker. As an example, the query is depicted as "SELECT ID FROM Orders+Customers WHERE ID=2 AND Max Orders Marker<=Y."

Figure 17:
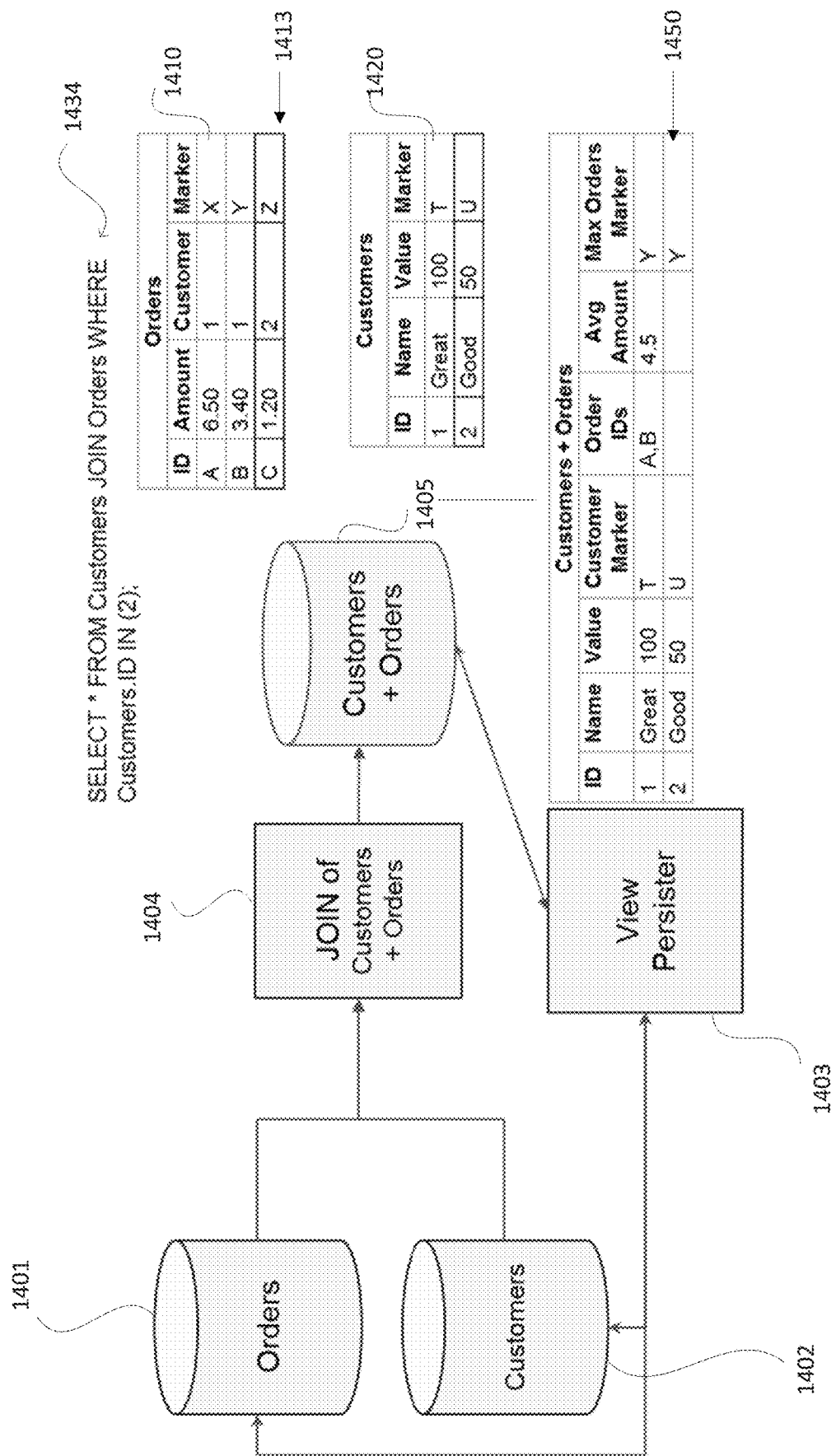
FIG. 17 illustrates selecting updated rows using primary keys of base table, in accordance with one or more aspects of the disclosure.

FIG. 17 illustrates selecting updated rows using primary keys of base table, in accordance with one or more aspects of the disclosure. The example depicts performing an updated join between the first dataset and the second dataset that is limited to the rows identified (e.g., using the resultant primary key values) from the materialized view. The identified row in the materialized view was the second row 1450 of the view with ID=2. Thus an updated join is performed between "Orders" and "Customers" table for the row with the value of primary key ID=2 in the "Customers" table. As an example, the query 1434 is depicted as "SELECT*FROM Customers JOIN Orders WHERE Customers.ID IN (2)."

Figure 18:
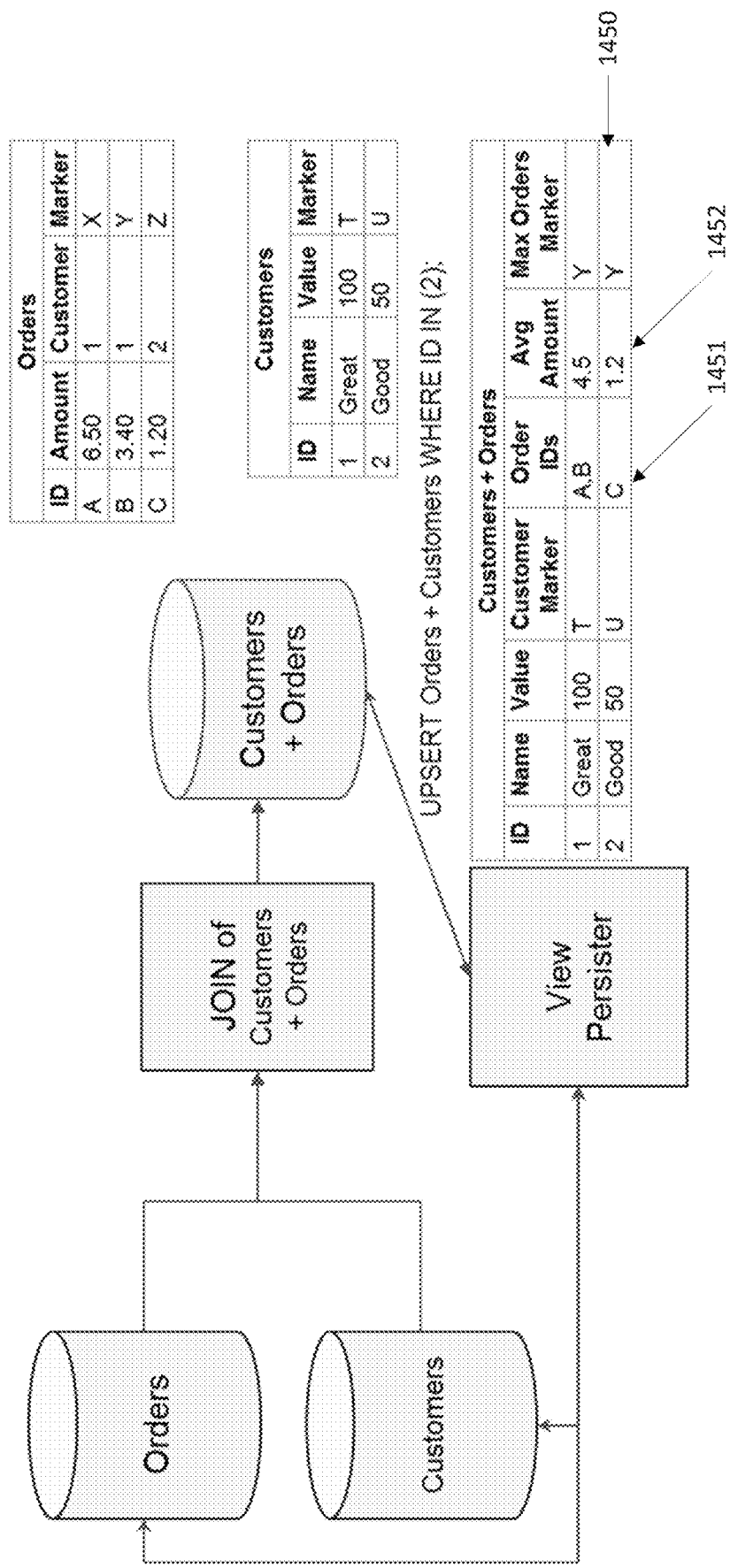
FIG. 18 illustrates presenting updated rows with updated markers, in accordance with one or more aspects of the disclosure.

FIG. 18 illustrates presenting updated rows with updated markers, in accordance with one or more aspects of the disclosure. The identified rows in the materialized view may be updated based on the identified updates to the one or more rows of the first dataset and the second dataset. In the example, the results of the join for the updated rows in the base table may be used to update the materialized view. The identified row in the materialized view was the second row 1450 with ID=2 in the materialized view 1405 "Customers+Orders." Thus, the row 1450 in the materialized view 1405 with ID=2 is updated with the values derived from the base tables based on the updated join between the base tables. As an example, the query 1435 is depicted as "UPSERT Orders+Customers WHERE ID IN (2)." The view 1405 is thus updated with the updated values from the base tables for impacted rows of the materialized view without having to perform the join using all values of the base tables. The updated view has the row 1450 with ID=2 where the value 1452 of "Avg Amount" column changed from "a missing value" to "1.2" and the value 1451 of "Order IDs" is changed from "a missing value" to "C" as a result of updates in the base tables.

In one implementation, the process can be triggered based on an update to a dataset used in a view. For example, if a data in a row of a table that is used in a view is updated by a user, the process may be triggered. In another implementation, the process can be run on an ad hoc basis. That is, the process may be manually triggered when a user intends to obtain any updates to the view. In another implementation, the process can be performed on a scheduled basis. That is, a scheduled job may be set up to run the process in a specified frequency of time.

Figure 19:
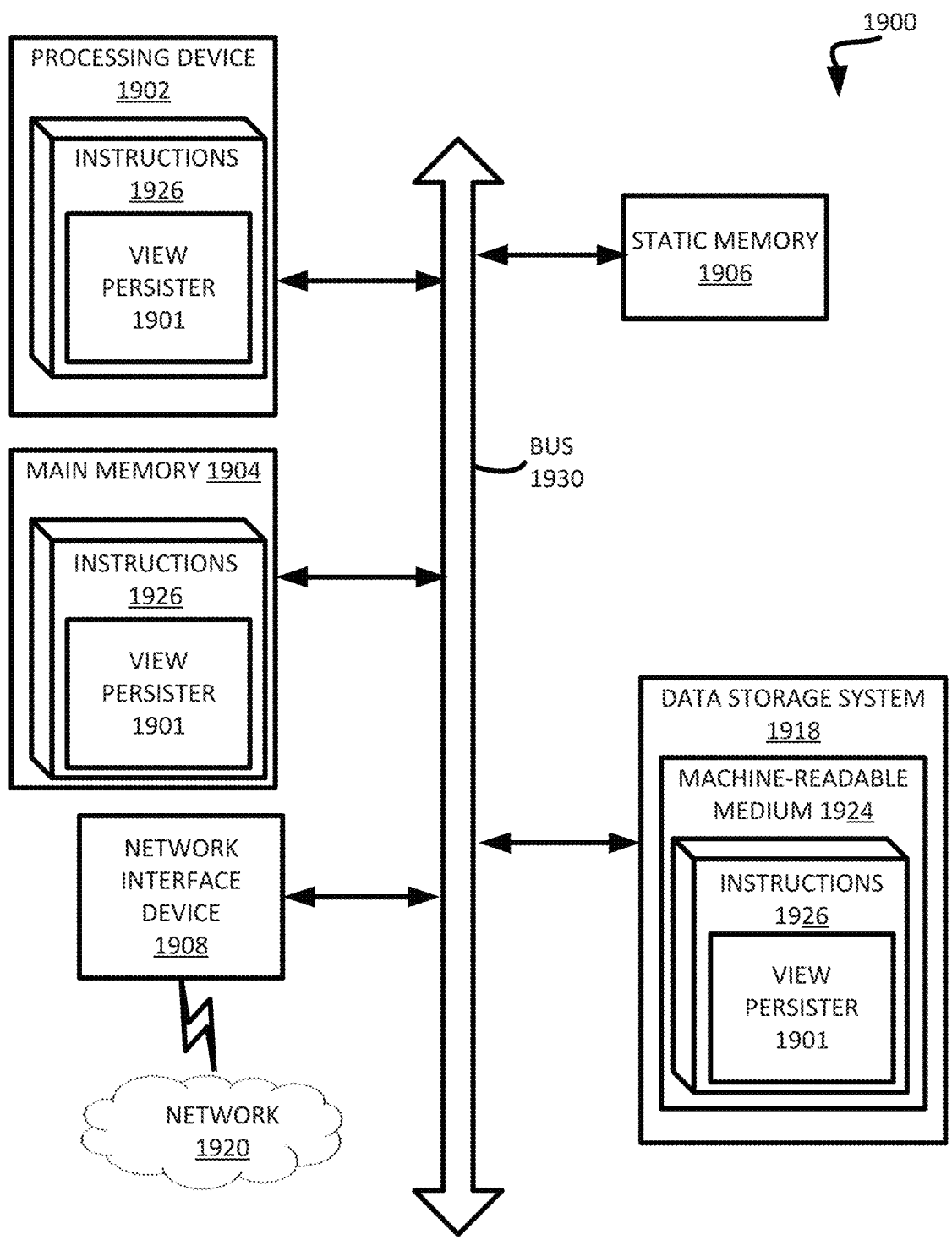
FIG. 19 is a block diagram of an example computer system in which embodiments of the present disclosure may operate.

FIG. 19 illustrates an example machine of a computer system 1900 within which a set of instructions, for causing the machine to perform any one or more of the methodologies discussed herein, can be executed. In one example, computer system 1900 may correspond to a computing device capable of executing operations described in FIGS. 1-18. In another example, computer system 1900 may correspond to a computing device capable of executing the view persister of FIGS. 1-18. The computer system 1900 can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 1900 includes a processing device 1902, a main memory 1904 (e.g., memory devices, such as, read-only memory (ROM), flash memory, dynamic random access memory (DRAM) such as synchronous DRAM (SDRAM) or Rambus DRAM (RDRAM), etc.), a static memory 1906 (e.g., flash memory, static random access memory (SRAM), etc.), and a data storage system 1918, which communicate with each other via a bus 1930.

Processing device 1902 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 1902 can also be one or more special-purpose processing devices such as an application specific integrated circuit (ASIC), a field programmable gate array (FPGA), a digital signal processor (DSP), network processor, or the like. The processing device 1902 is configured to execute instructions 1926 for performing the operations and steps discussed herein. The computer system 1900 can further include a network interface device 1908 to communicate over the network 1920.

The data storage system 1918 can include a machine-readable storage medium 1924 (also known as a computer-readable medium) on which is stored one or more sets of instructions 1926 or software embodying any one or more of the methodologies or functions described herein. The instructions 1926 can also reside, completely or at least partially, within the main memory 1904 and/or within the processing device 1902 during execution thereof by the computer system 1900, the main memory 1904 and the processing device 1902 also constituting machine-readable storage media.

In one embodiment, the instructions 1926 include instructions to implement functionality corresponding to a view persister 1901 (e.g., the view persister 103, 703, 1403, etc. of FIGS. 1-18). While the machine-readable storage medium 1924 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Figure 20:
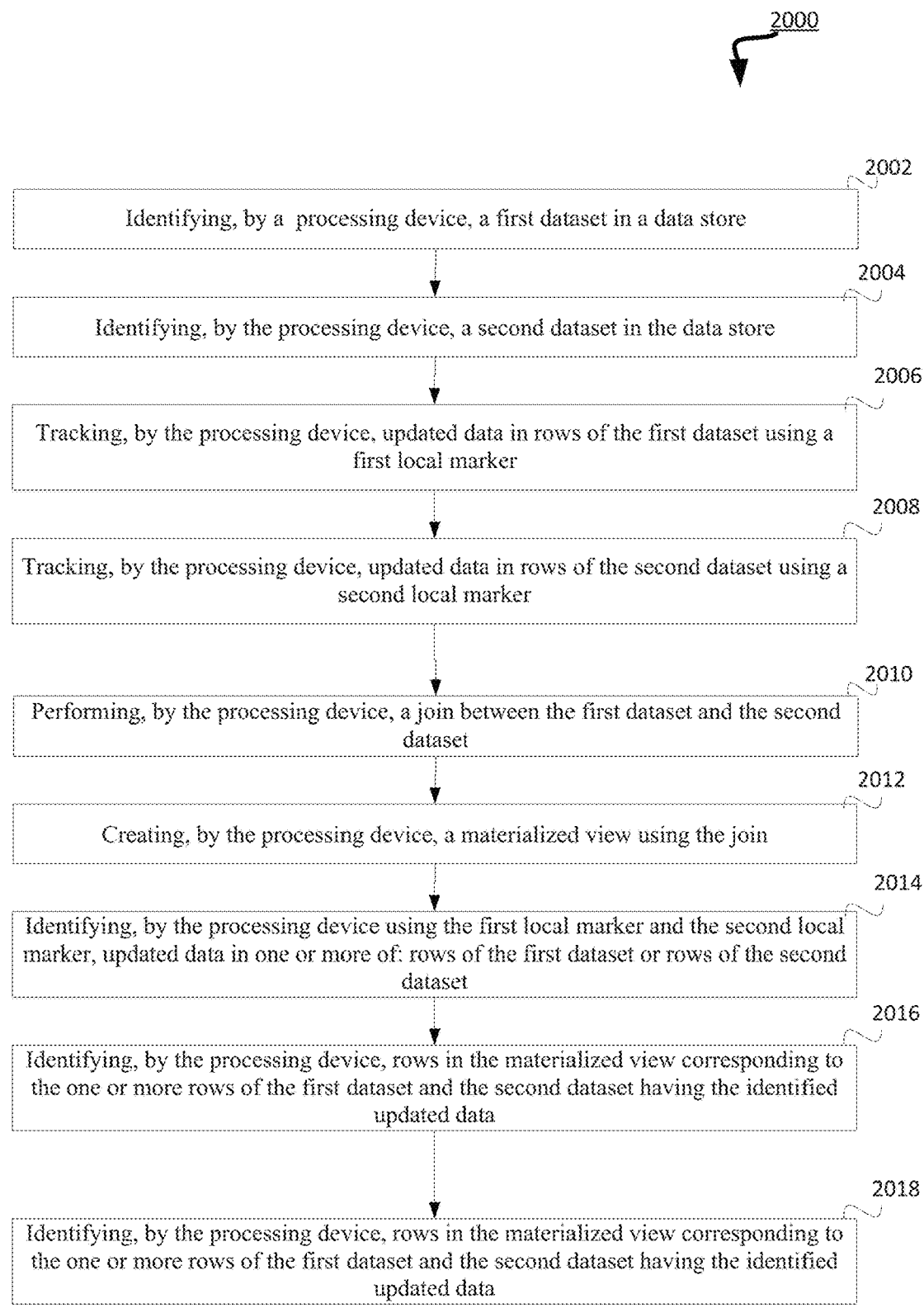
FIG. 20 is a flow diagram of an example method to present updated data in a data store using persisting views, in accordance with some embodiments of the present disclosure.

FIG. 20 is a flow diagram of an example method to present updated data in a data store using persisting views, in accordance with some embodiments of the present disclosure. The method 2000 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 2000 is performed by a view persister (such as the view persister described in FIGS. 1-18). Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 2002, the processing logic identifies a first dataset in a data store. At operation 2004, the processing logic identifies a second dataset in the data store. At operation 2006, the processing logic tracks updated data in rows of the first dataset using a first local marker. At operation 2008, the processing logic tracks updated data in rows of the second dataset using a second local marker. In some examples, the first local marker includes a first particular column in the first dataset to track one or more rows of the first dataset having one or more updated data, and wherein the second local marker includes a second particular column in the second dataset to track one or more rows of the second dataset having another one or more updated data. In some examples, the first local marker includes a first data associated with a first data type where a value of the first data is restricted to a first monotonically increasing value, and the second local marker includes a second data associated with a second data type where a value of the second data is restricted to a second monotonically increasing value. In some examples, the first data type and the second data type each can include a timestamp, a ROWVERSION, and/or serials data types.

At operation 2010, the processing logic performs a join between the first dataset and the second dataset. At operation 2012, the processing logic creates a materialized view using the join. At operation 2014, the processing logic identifies, using the first local marker and the second local marker, updated data in one or more of: rows of the first dataset or rows of the second dataset. In an example, identifying the updated data includes comparing each of the first local marker and the second local marker to a stored running tally marker.

At operation 2016, the processing logic identifies rows in the materialized view corresponding to the one or more rows of the first dataset and the second dataset having the identified updated data. At operation 2018, the processing logic identifies rows in the materialized view corresponding to the one or more rows of the first dataset and the second dataset having the identified updated data. In further examples, a transaction on the first dataset or the second dataset is configured to be limited to a bounded transaction. In some examples, the bounded transaction can include a time-limited transaction, a size size-limited transaction, and/or an action action-limited transaction.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method comprising:
   identifying, by a processing device, a first base table in a data store, the first base table comprising a first local marker for tracking updates to rows of the first base table, wherein the first local marker is associated with a first initial value;
   identifying, by the processing device, a second base table in the data store, the second base table comprising a second local marker for tracking updates to rows of the second base table, wherein the second local marker is associated with a second initial value;
   responsive to detecting an update to first data in one or more rows of the first base table, adding a first updated value of the first local marker to the first base table based on the update;
   responsive to detecting an update to second data in one or more rows of the second base table, adding a second updated value of the second local marker to the second base table based on the update;
   performing, by the processing device, a join between the first base table and the second base table;
   creating, by the processing device, a materialized view using the join, wherein the materialized view comprises a first tally marker associated with the first base table and a second tally marker associated with the second base table;
   determining, by the processing device, that at least one of the first data has been updated in the one or more of rows of the first base table or the second data has been updated in the one or more rows of the second base table based on at least one of a first difference between a value of the first tally marker and the first updated value of the first local marker or a second difference between a value of the second tally marker and the second updated value of the second local marker;
   identifying, by the processing device, rows in the materialized view corresponding to the one or more of rows of the first base table having the updated first data or rows of the second base table having the updated second data; and
   updating, by the processing device, the identified rows in the materialized view based on the updated first data in the one or more of rows of the first base table or the updated second data in the one or more rows of the second base table.

2. The method of claim 1, wherein the first local marker is included in a first particular column in the first base table associated with tracking one or more rows of the first base table having updated data, and wherein the second local marker is included in a second particular column in the second base table associated with tracking one or more rows of the second base table having another updated data.

3. The method of claim 1, wherein the first local marker comprises a first data associated with a first data type, wherein a value of the first data is restricted to a first monotonically increasing value, and wherein the second local marker comprises a second data associated with a second data type, wherein a value of the second data is restricted to a second monotonically increasing value.

4. The method of claim 3, wherein the first data type and the second data type each comprises one or more of: a timestamp, a ROWVERSION, or serials.

5. The method of claim 1, wherein a transaction on the first base table or the second base table is configured to be limited to a bounded transaction.

6. The method of claim 5, wherein the bounded transaction comprises one or more of: a time-limited transaction, a size-limited transaction, or an action-limited transaction.

7. The method of claim 1, wherein determining that at least one of first data or the second data has been updated comprises:
comparing, by the processing device, at least one of the first updated value of the first local marker to the value of the first tally marker or the second updated value of the second local marker to the value of the second tally marker.

8. A system comprising:
a memory; and
a processing device communicably coupled to the memory, the processing device to:
identify a first base table in a data store, the first base table comprising a first local marker for tracking updates to rows of the first base table, wherein the first local marker is associated with a first initial value;
identify a second base table in the data store, the second base table comprising a second local marker for tracking updates to rows of the second base table, wherein the second local marker is associated with a second initial value;
responsive to detecting an update to first data in one or more rows of the first base table, add a first updated value of the first local marker to the first base table based on the update;
responsive to detecting an update to second data in one or more rows of the second base table, add a second updated value of the second local marker to the second base table based on the update;
perform a join between the first base table and the second base table;
create a materialized view using the join, wherein the materialized view comprises a first tally marker associated with the first base table and a second tally marker associated with the second base table;
determining that at least one of the first data has been updated in the one or more of rows of the first base table or the second data has been updated in the one or more rows of the second base table based on at least one of a first difference between a value of the first tally marker and the first updated value of the first local marker or a second difference between a value of the second tally marker and the second updated value of the second local marker;
identify, rows in the materialized view corresponding to the one or more of rows of the first base table having the updated first data or rows of the second base table having the updated second data; and
update, the identified rows in the materialized view based on the updated first data in the one or more of rows of the first base table or the updated second data in the one or more rows of the second base table.

9. The system of claim 8, wherein the first local marker is included in a first particular column in the first base table associated with tracking one or more rows of the first base table having updated data, and wherein the second local marker is included in a second particular column in the second base table associated with tracking one or more rows of the second base table having another updated data.

10. The system of claim 8, wherein the first local marker comprises a first data associated with a first data type, wherein a value of the first data is restricted to a first monotonically increasing value, and wherein the second local marker comprises a second data associated with a second data type wherein a value of the second data is restricted to a second monotonically increasing value.

11. The system of claim 10, wherein the first data type and the second data type each comprises one or more of: a timestamp, a ROWVERSION, or serials.

12. The system of claim 8, wherein a transaction on the first base table or the second base table is configured to be limited to a bounded transaction.

13. The system of claim 12, wherein the bounded transaction comprises one or more of: a time-limited transaction, a size limited transaction, or an action limited transaction.

14. The system of claim 8, wherein to determine that at least one of the first data or the second data has been updated, the processing device is to:
compare at least one of the first local marker to the first tally marker or the second local marker to the second tally marker.

15. A non-transitory machine-readable storage medium storing instructions that cause a processing device to:
identify a first base table in a data store, the first base table comprising a first local marker for tracking updates to rows of the first base table, wherein the first local marker is associated with a first initial value;
identify a second base table in the data store, the second base table comprising a second local marker for tracking updates to rows of the second base table, wherein the second local marker is associated with a second initial value;
responsive to detecting an update to first data in one or more rows of the first base table, add a first updated value of the first local marker to the first base table based on the update;
responsive to detecting an update to second data in one or more rows of the second base table, add a second updated value of the second local marker to the second base table based on the update;
perform a join between the first base table and the second base table;
create a materialized view using the join, wherein the materialized view comprises a first tally marker associated with the first base table and a second tally marker associated with the second base table;
determining that at least one of the first data has been updated in the one or more of rows of the first base table or the second data has been updated in the one or more rows of the second base table based on at least one of a first difference between a value of the first tally marker and the first updated value of the first local marker or a second difference between a value of the second tally marker and the second updated value of the second local marker;
identify, rows in the materialized view corresponding to the one or more of rows of the first base table having the updated first data or rows of the second base table having the updated second data; and
update, the identified rows in the materialized view based on the updated first data in the one or more of rows of the first base table the updated second data in the one or more or rows of the second base table.

16. The non-transitory machine-readable storage medium of claim 15, wherein the first local marker is included in a first particular column in the first base table associated with tracking one or more rows of the first base table having updated data, and wherein the second local marker is included in a second particular column in the second base table associated with tracking one or more rows of the second base table having another updated data.

17. The non-transitory machine-readable storage medium of claim 15, wherein the first local marker comprises a first data associated with a first data type, wherein a value of the first data is restricted to a first monotonically increasing value, and wherein the second local marker comprises a second data associated with a second data type wherein a value of the second data is restricted to a second monotonically increasing value.

18. The non-transitory machine-readable storage medium of claim 17, wherein the first data type and the second data type each comprises one or more of: a timestamp, a ROW-VERSION, or serials.

19. The non-transitory machine-readable storage medium of claim 15, wherein a transaction on the first base table or the second base table is configured to be limited to a bounded transaction.

20. The non-transitory machine-readable storage medium of claim 19, wherein the bounded transaction comprises one or more of: a time-limited transaction, a size-limited transaction, or an action-limited transaction.

\* \* \* \* \*